US010023666B2

(12) United States Patent
Lowell et al.

(10) Patent No.: US 10,023,666 B2
(45) Date of Patent: Jul. 17, 2018

(54) PROCESS FOR TRANSITIONING BETWEEN LOW PERCENTAGE CHROME AND HIGH PERCENTAGE CHROME CATALYSTS

(71) Applicant: Chevron Phillips Chemical Company LP, The Woodlands, TX (US)

(72) Inventors: Jeff S. Lowell, Huffman, TX (US); Daniel M. Hasenberg, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 43 days.

(21) Appl. No.: 15/377,684

(22) Filed: Dec. 13, 2016

(65) Prior Publication Data

US 2018/0162969 A1    Jun. 14, 2018

(51) Int. Cl.
| C08F 110/02 | (2006.01) |
| C08F 2/34 | (2006.01) |
| C08F 2/44 | (2006.01) |
| C08F 210/16 | (2006.01) |

(52) U.S. Cl.
CPC ................... C08F 110/02 (2013.01)

(58) Field of Classification Search
CPC ........... C08F 2/34; C08F 2/44; C08F 2410/05
USPC ..................................... 526/68, 86
See application file for complete search history.

(56) References Cited

U.S. PATENT DOCUMENTS

| 4,543,399 A | 9/1985 | Jenkins, III et al. |
| 4,588,790 A | 5/1986 | Jenkins, III et al. |
| 5,541,270 A * | 7/1996 | Chinh ................ B01J 8/1809 526/348 |
| 6,174,971 B1 | 1/2001 | Chen et al. |
| 6,262,192 B1 * | 7/2001 | Wu ................ B01J 8/1827 526/67 |

(Continued)

FOREIGN PATENT DOCUMENTS

| EP | 1954725 A1 | 8/2008 |
| WO | 2007059867 A1 | 5/2007 |

OTHER PUBLICATIONS

McNaught, Alan D., et al., "Compendium of Chemical Terminology," IUPAC Recommendations, Second edition, 1997, 5 pages, Wiley-Blackwell.

*Primary Examiner* — Fred M Teskin
(74) *Attorney, Agent, or Firm* — Conley Rose, P.C.; Rodney B. Carroll; Monte R. Rhodes

(57) ABSTRACT

A method of transitioning from a first catalyst to a second catalyst in a gas phase fluidized bed reactor comprising continuously feeding the first catalyst and a recycle stream comprising olefin monomer to the reactor; wherein the monomer contacts the first catalyst in the fluidized bed and polymerizes; wherein the reactor is operating in condensing mode (withdrawing a gaseous stream comprising unreacted monomer from the reactor, cooling the gaseous stream to condense a portion thereof, and contacting the cooled gaseous stream with fresh monomer to form the recycle stream); and wherein a liquid phase of the recycle stream evaporates within the fluidized bed; discontinuing the first catalyst to the reactor while continuing to feed the recycle stream; maintaining the condensing mode in reactor at >3 wt. % liquid phase in recycle stream while no fresh catalyst is introduced to reactor; and introducing the second catalyst to the reactor operating in condensing mode.

25 Claims, 16 Drawing Sheets

(56) References Cited

U.S. PATENT DOCUMENTS

| | | |
|---|---|---|
| 6,486,274 B1 | 11/2002 | Gray et al. |
| 6,825,292 B2 * | 11/2004 | Reid ........................ C08F 10/00 526/115 |
| 6,833,417 B2 | 12/2004 | Ehrman et al. |
| 6,841,630 B2 | 1/2005 | Terry et al. |
| 6,858,684 B2 | 2/2005 | Burdett et al. |
| 6,949,612 B2 | 9/2005 | Agapiou et al. |
| 7,163,906 B2 | 1/2007 | McDaniel et al. |
| 7,343,225 B2 | 3/2008 | Hartley et al. |
| 7,619,047 B2 | 11/2009 | Yang et al. |
| 7,629,422 B2 | 12/2009 | Goode et al. |
| 7,790,820 B2 | 9/2010 | Jensen et al. |
| 7,960,487 B2 | 6/2011 | Yang et al. |
| 8,138,113 B2 | 3/2012 | Yang et al. |
| 8,207,280 B2 | 6/2012 | Murray et al. |
| 8,268,944 B2 | 9/2012 | Yang et al. |
| 8,450,436 B2 | 5/2013 | Masino et al. |
| 9,181,372 B2 | 11/2015 | Yang et al. |

\* cited by examiner

PROCESS FOR TRANSITIONING BETWEEN LOW PERCENTAGE CHROME AND HIGH PERCENTAGE CHROME CATALYSTS

TECHNICAL FIELD

The present disclosure generally relates to the production of polyethylene. More specifically, this disclosure relates to a process for producing polyethylene in a gas phase reactor.

BACKGROUND

Polymers, such as polyolefins, are plastic materials useful for making a wide variety of valued products due to their combination of stiffness, ductility, barrier properties, temperature resistance, optical properties, availability, and low cost. In particular, polyethylene is one of the largest volume polymers consumed in the world.

Different products employ polyolefins with various properties, which are generally produced under diverse conditions, such as different catalysts, temperature, pressure, etc. In certain instances, polyolefins with diverse properties can be produced in the same reactor, under different sets of conditions. However, transitioning between different sets of conditions, such as different catalysts systems, can involve shutting down the reactor, resulting in a loss of polyolefin production. Thus, there is an ongoing need for developing efficient processes for continuously transitioning between different reactor conditions during polyolefin production.

BRIEF SUMMARY

Disclosed herein is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed, (b) discontinuing the introduction of the first catalyst system to the gas phase fluidized bed reactor while continuing to feed the recycle stream to the gas phase fluidized bed reactor, (c) maintaining the condensing mode in the gas phase fluidized bed reactor at a level of at least 3 wt. % liquid phase in the recycle stream, based on the total weight of the recycle stream for a first time period while no fresh catalyst system is introduced to the gas phase fluidized bed reactor, and (d) introducing the second catalyst system to the gas phase fluidized bed reactor after the first time period, wherein the gas phase fluidized bed reactor is operating in condensing mode.

Also disclosed herein is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction to produce a first polymer product; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; and wherein the gas phase fluidized bed reactor is characterized by a first fluidized bed temperature, (b) discontinuing the introduction of the first catalyst system to the gas phase fluidized bed reactor while continuing to feed the recycle stream to the gas phase fluidized bed reactor, (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, (d) introducing the second catalyst system to the gas phase fluidized bed reactor after the first time period; wherein the gas phase fluidized bed reactor is operating in condensing mode; wherein the gas phase fluidized bed reactor is operating at the first fluidized bed temperature for a second time period, and (e) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream.

Further disclosed herein is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; and wherein the gas phase fluidized bed reactor is characterized by a first fluidized bed temperature, (b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed, (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed, (d) introducing the second catalyst system to the gas phase fluidized bed reactor after the first time period; wherein the gas phase fluidized bed reactor is operating in condensing mode; and wherein the gas phase fluidized bed reactor is operating at the first fluidized bed temperature for a second time period, (e) increasing a bed amount of antistatic agent from the first bed amount of antistatic agent to a second bed amount of antistatic agent during a first portion of the second time period, while continuing to introduce the first expanded section amount of antistatic agent to the reactor expanded section, (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount, and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed.

Further disclosed herein is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; wherein the gas phase fluidized bed reactor is characterized by a first fluidized bed temperature; wherein the first catalyst system is characterized by a first catalyst particle size; and wherein the first catalyst system comprises chromium (Cr) in an amount of from about 0.1 wt. % to about 0.5 wt. %, based on the total weight of the first catalyst system, (b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed, (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed, (d) introducing the second catalyst system to the gas phase fluidized bed reactor after the first time period; wherein the gas phase fluidized bed reactor is operating in condensing mode; wherein the gas phase fluidized bed reactor is operating at the first fluidized bed temperature for a second time period, wherein the second catalyst system is characterized by a second catalyst particle size; wherein the second catalyst particle size is larger than the first catalyst particle size; and wherein the second catalyst system comprises chromium (Cr) in an amount of from about 0.75 wt. % to about 1.25 wt. %, based on the total weight of the second catalyst system, (e) increasing a bed amount of antistatic agent from the first bed amount of antistatic agent to a second bed amount of antistatic agent during a first portion of the second time period, while continuing to introduce the first expanded section amount of antistatic agent to the reactor expanded section, (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount, and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed.

Further disclosed herein is a method of transitioning from a first catalyst system to a second catalyst system in a gas phase fluidized bed ethylene polymerization reactor, the method comprising (a) continuously feeding the first catalyst system and a recycle stream comprising ethylene to the gas phase fluidized bed reactor; wherein a portion of the ethylene contacts the first catalyst in the fluidized bed of the reactor and undergoes an exothermic polymerization reaction to produce a first polyethylene product; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted ethylene, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh ethylene to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; wherein the gas phase fluidized bed reactor is characterized by a first fluidized bed temperature; wherein the first catalyst system is characterized by a first catalyst particle size; and wherein the first catalyst system comprises chromium in an amount of from about 0.1 wt. % to about 0.5 wt. %, based on the total weight of the first catalyst system, (b) discontinuing the introduction of the first catalyst system to the gas phase fluidized bed reactor while continuing to feed the recycle stream to the gas phase fluidized bed reactor, while continuing to introduce the first expanded section amount of antistatic agent to the reactor expanded section and the first bed amount of antistatic agent to the fluidized bed, and while continuing to produce the first polyethylene product, (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, while continuing to introduce the first expanded section amount of antistatic agent to the reactor expanded section and the first bed amount of antistatic agent to the fluidized bed, and while continuing to produce the first polyethylene product, (d) introducing the second catalyst system to the gas phase fluidized bed reactor after the first time period; wherein the gas phase fluidized bed reactor is operating in condensing mode; wherein a portion of the ethylene contacts the second catalyst in the fluidized bed of the reactor and undergoes an exothermic polymerization reaction to produce a second polyethylene product; wherein the gas phase fluidized bed reactor is operating at the first fluidized bed temperature for a second time period, while continuing to produce the first polyethylene product; wherein the second catalyst system is characterized by a second catalyst particle size; wherein the second catalyst particle size is larger than the first catalyst particle size; and wherein the second catalyst system comprises chromium in an amount of from about 0.75 wt. % to about 1.25 wt. %, based on the total weight of the second catalyst system, (e) increasing a bed amount of antistatic agent from the first bed amount of antistatic agent to a second bed amount of antistatic agent during a first portion of the second time period, while continuing to introduce the first expanded section amount of antistatic agent to the reactor expanded section, and while continuing to produce the first polyethylene product, (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount, and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, while continuing to introduce the second expanded section amount of antistatic agent to the reactor expanded section and the second bed amount of antistatic agent to the fluidized bed, and while continuing to produce the second polyethylene product.

BRIEF DESCRIPTION OF THE DRAWINGS

For a detailed description of the disclosed processes and systems, reference will now be made to the accompanying drawings in which.

DETAILED DESCRIPTION

Figure 1:
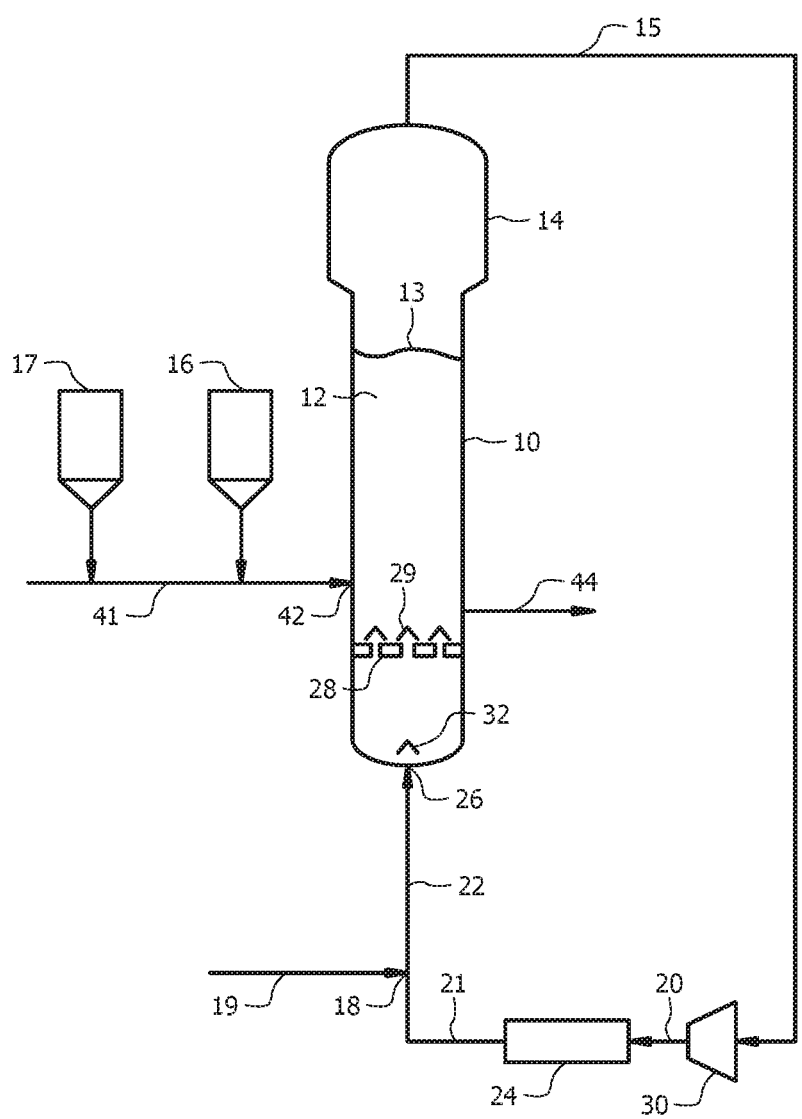
FIG. 1 illustrates a schematic of a gas phase reactor system.

It should be understood at the outset that although an illustrative implementation of one or more aspects are provided below, the disclosed systems, methods, or both can be implemented using any number of techniques, whether currently known or in existence. The disclosure should in no way be limited to the illustrative implementations, drawings, and techniques illustrated below, including the exemplary designs and implementations illustrated and described herein, but can be modified within the scope of the appended claims along with their full scope of equivalents.

Disclosed herein are systems, apparatuses, and processes related to petrochemical production processes, for example the production of polyethylene. The systems, apparatuses, and processes are generally related to transitioning from a first catalyst system to a second catalyst system in petrochemical production processes, for example in the production of polyethylene.

A method of transitioning from a first catalyst system to a second catalyst system in a gas phase fluidized bed olefin polymerization reactor can comprise the steps of (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; and wherein the gas phase fluidized bed reactor is characterized by a first fluidized bed temperature; (b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed; (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed; (d) introducing the second catalyst system to the gas phase fluidized bed reactor after the first time period; wherein the gas phase fluidized bed reactor is operating in condensing mode; and wherein the gas phase fluidized bed reactor is operating at the first fluidized bed temperature for a second time period; (e) increasing a bed amount of antistatic agent from the first bed amount of antistatic agent to a second bed amount of antistatic agent during a first portion of the second time period, while continuing to introduce the first expanded section amount of antistatic agent to the reactor expanded section; (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount; and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed. The olefin monomer can comprise ethylene; the first catalyst system can comprise chromium (Cr) in an amount of from about 0.1 wt. % to about 0.5 wt. %, based on the total weight of the first catalyst system; and the second catalyst system can comprise Cr in an amount of from about 0.75 wt. % to about 1.25 wt. %, based on the total weight of the second catalyst system. The first catalyst system can be characterized by a first catalyst particle size, and the second catalyst system can be characterized by a second catalyst particle size; wherein the second catalyst particle size is larger than the first catalyst particle size. While the present disclosure will be discussed in detail in the context of a process for transitioning from a first catalyst system to a second catalyst system in a polyethylene production system, it should be understood that such process or any steps thereof can be applied in any suitable petrochemical production process requiring a catalyst transition in a gas phase reactor. The catalyst systems can comprise any suitable catalyst systems compatible with the disclosed methods and materials.

The following definitions are provided in order to aid those skilled in the art in understanding the detailed description of the present invention. Unless otherwise defined herein, scientific and technical terms used in connection with the present invention shall have the meanings that are commonly understood by those of ordinary skill in the art to which this invention belongs. Further, unless otherwise required by context, singular terms shall include pluralities and plural terms shall include the singular.

Unless explicitly stated otherwise in defined circumstances, all percentages, parts, ratios, and like amounts used herein are defined by weight.

Further, certain features of the present invention which are, for clarity, described herein in the context of separate embodiments, may also be provided in combination in a single embodiment. Conversely, various features of the invention that are, for brevity, described in the context of a single embodiment, may also be provided separately or in any sub-combination.

If a term is used in this disclosure but is not specifically defined herein, the definition from the IUPAC Compendium of Chemical Terminology, 2nd Ed (1997), can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is inclusive or open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claim. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst system consisting of specific components; alternatively, consisting essentially of specific components; or alternatively, comprising the specific components and other non-recited components.

In this disclosure, while systems, processes, and methods are often described in terms of "comprising" various components, devices, or steps, the systems, processes, and methods can also "consist essentially of" or "consist of" the various components, devices, or steps, unless stated otherwise.

The term "about" as used herein means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities. The term "about" may mean within 10% of the reported numerical value, preferably within 5% of the reported numerical value.

Although any methods, devices, and materials similar or equivalent to those described herein can be used in the practice or testing of the invention, the typical methods, devices, and materials are herein described.

Referring to FIG. 1, a gas phase reactor (GPR) system 100 is disclosed, for example a GPR employed in a gas phase, fluidized catalyst bed olefin polymerization process. GPR system 100 generally comprises a GPR 10, a first catalyst storage tank 16, a second catalyst storage tank 17, a heat exchanger 24, and a compressor 30. In the GPR embodiments disclosed herein, various system components can be in fluid communication via one or more conduits (e.g., pipes, tubing, flow lines, etc.) suitable for the conveyance of a particular stream, for example as shown in detail by the numbered streams in FIG. 1. The GPR system 100 can be operated to produce one or more polymer products as described in more detail herein.

A method of transitioning from a first catalyst system to a second catalyst system in a gas phase fluidized bed olefin polymerization reactor such as GPR 10 can comprise a step of operating the gas phase fluidized bed olefin polymerization reactor in condensing mode under steady state conditions in the presence of the first catalyst system to produce a first polymer product. Generally, a reactor that operates at steady state must have a mass flow through the reactor, and such reactor is characterized by constant state variables, for example operating temperature(s), operating pressure(s); amount of reactants (e.g., monomer, comonomer, etc.); amount of catalyst; amount of diluent, if used; fluidized bed height, volume, or both (when a fluidized bed is employed in the reactor); etc. Generally, operating a GPR in condensing mode can comprise continuously introducing (e.g., feeding) a recycle stream to the reactor to fluidize the bed, wherein the recycle stream comprises an olefin monomer; continuously withdrawing a gaseous stream from the GPR, wherein the gaseous stream comprises unreacted olefin monomer; condensing (e.g., by cooling) a portion of the gaseous stream to produce a liquid phase, and contacting the gaseous stream comprising the liquid phase with fresh olefin monomer (to replace the polymerized monomer) to form the recycle stream comprising the liquid phase.

Simultaneously, a polymer product (e.g., a first polymer product) can be continuously withdrawn from the GPR. Further, more than one GPR can be operated in series or parallel. Operation of gas phase polymerization reactors in condensing mode is described in more detail in U.S. Pat. Nos. 4,543,399; and 4,588,790; each of which is incorporated by reference herein in its entirety.

Operating the gas phase fluidized bed olefin polymerization reactor in condensing mode under steady state conditions in the presence of a catalyst system (e.g., first catalyst system, second catalyst system) can comprise continuously feeding the catalyst system and a recycle stream comprising an olefin monomer to the gas phase fluidized bed reactor, wherein a portion of the olefin monomer contacts the catalyst in the fluidized bed of the reactor and undergoes an exothermic polymerization reaction to produce a polymer product (e.g., a first polymer product, a second polymer product).

Operating the gas phase fluidized bed olefin polymerization reactor in condensing mode under steady state conditions in the presence of the first catalyst system can comprise continuously feeding the first catalyst system and a recycle stream comprising an olefin monomer to the gas phase fluidized bed reactor, wherein a portion of the olefin monomer contacts the first catalyst in the fluidized bed of the reactor and undergoes an exothermic polymerization reaction to produce a first polymer product.

The olefin monomer can comprise any suitable gas phase olefin, such as ethylene, propylene, 1-butene, 1-hexene, 1-heptene, 1-octene, and the like, or combinations thereof. The olefin monomer can be polymerized in the presence of a comonomer, such as an unsaturated hydrocarbon having from 3 to 20 carbon atoms. Nonlimiting examples of comonomers suitable for use in the present disclosure include alpha olefins, such as for example propylene, 1-butene, 1-pentene, 1-hexene, 3-methyl-1-butene, 4-methyl-1-pentene, 1-heptene, 1-octene, 1-nonene, 1-decene, and the like, or combinations thereof.

The GPR 10 (e.g., gas phase, fluidized catalyst bed olefin polymerization reactor) can comprise a fluidized bed 12 (e.g., a reaction zone comprising a fluidized bed of particles) and a reactor expanded section 14 (e.g., disengagement zone, reactor dome, reactor head space), wherein the reactor expanded section 14 is located above the fluidized bed 12. The reactor expanded section 14 can also be referred to as a "velocity reduction zone," wherein fluidized bed particles do not possess enough kinetic energy to continue moving away from the fluidized bed, and thereby return to (fall via gravity into) the fluidized bed 12. The fluidized bed 12 can comprise fluidized bed particles, such as growing polymer particles, formed polymer particles, and catalyst particles. Bed particles can be fluidized by a continuous flow of a recycle stream 22 through the fluidized bed 12. As will be appreciated by one of skill in the art, and with the help of this disclosure, the presence of polymer particles in addition to catalyst particles in the fluidized bed can prevent the formation of localized "hot spots" within the bed. On startup, the GPR 10 can be charged with polymer particles (e.g., a seed bed) before gas flow is initiated, wherein such particles can be the same as or different than the polymer particles that will be produced in the reactor, once the reactor reaches steady state.

The fluidized bed 12 has the general appearance of a dense mass of individually moving particles (e.g., fluidized bed particles) as created by the percolation of gas flowing through the bed. The fluidized bed 12 can be an ebullated bed. A height to diameter ratio of the fluidized bed 12 can be any suitable height to diameter ratio that allows for a desired production capacity. For example, a height to diameter ratio of the fluidized bed 12 can be from about 2.7:1 to about 8:1, or alternatively from about 3:1 to about 7.5:1. The height of the fluidized bed 12 can be from a bottom of the fluidized bed 12 (located proximate to or immediately above a gas distribution plate 28) to a top 13 of the fluidized bed 12.

A diameter of the reactor expanded section 14 is greater than a diameter of the fluidized bed 12 (e.g., the inner diameter of the reactor vessel proximate to the fluidized bed). A ratio of a cross-sectional area of the reactor expanded section 14 to a cross-sectional area of the fluidized bed 12 can be from about 1:1 to about 3:1, alternatively from about 1.5:1 to about 2.5:1, or alternatively from about 1.5:1 to about 2:1.

A gaseous stream 15 can be continuously withdrawn from the GPR 10, for example overhead from the reactor expanded section 14, wherein the gaseous stream 15 can comprise unreacted monomer and optional inert condensable diluent. For purposes of the disclosure herein, the term "inert" used with respect to the condensable diluent refers to compounds that can be used as diluents and which are chemically unreactive (e.g., chemically inert) with respect to the catalyst. The portion of the recycle stream that fluidizes the bed and which does not react in the bed (e.g., via a polymerization reaction) constitutes the gaseous stream 15 which is removed from the GPR 10, preferably by first passing it into the reactor expanded section 14 above the fluidized bed 12 where entrained particles (e.g., fluidized bed particles entrained in the gaseous stream travelling into the reactor expanded section 14) are given an opportunity to disengage from the gaseous stream and drop back into the bed.

Nonlimiting examples of inert condensable diluents suitable for use in the present disclosure can include a saturated hydrocarbon, butane, isobutane, n-pentane, isopentane, n-hexane, iso-hexanes, and the like, or combinations thereof.

The gaseous stream 15 can comprise unreacted monomer. The gaseous stream 15 can further comprise an inert gas (e.g., an inert gas used for introducing the catalyst system to the reactor); an inert condensable diluent; entrained fluidized bed particles (e.g., fines) that can be carried out of the reactor by the withdrawn gaseous stream; or combinations thereof. For purposes of the disclosure herein, the term "inert gas" refers to any suitable gas that is chemically unreactive (e.g., chemically inert) with respect to the catalyst. For example, propane can be considered an inert gas for purposes of the disclosure herein, as propane is chemically inert with respect to the polymerization catalyst.

At least a portion of the gaseous stream 15 can be introduced to compressor 30 to produce a compressed gaseous stream 20. As will be appreciated by one of skill in the art, and with the help of this disclosure, the composition of the gaseous stream is not affected by compressing it, and as such the composition of the compressed gaseous stream is the same as the composition of the gaseous stream. Further, as will be appreciated by one of skill in the art, and with the help of this disclosure, compressing the gaseous stream enables the condensable components (e.g., monomer, optional inert condensable diluent) in the gaseous stream to condense at a higher temperature than without the compressing step, which means that a subsequent cooling step will have to cool the gaseous stream less to achieve condensation. Further, as will be appreciated by one of skill in the art, and with the help of this disclosure, increasing the pressure of the gaseous stream can enable a desired flow rate of recycle stream 22 into the fluidized bed 12 (e.g., to achieve a desired fluidization velocity as the recycle stream enters the bed via gas distribution plate 28).

At least a portion of the compressed gaseous stream 20 can be introduced to the heat exchanger 24 to produce a cooled gaseous stream 21, wherein the cooled gaseous stream comprises a gas phase and a liquid phase. Cooling the compressed gaseous stream promotes the condensation of the condensable components (e.g., monomer, optional inert condensable diluent) of the compressed gaseous stream. As will be appreciated by one of skill in the art, and with the help of this disclosure, the composition of the compressed gaseous stream is not affected by cooling it, and as such the composition of the cooled gaseous stream (e.g., cooled gaseous stream 21) is the same as the composition of the compressed gaseous stream, although some of the components (e.g., monomer, optional inert condensable diluent) might change the phase they are present in, for example a component might change from a gas phase in the compressed gaseous stream to a vapor or liquid phase in the cooled gaseous stream. The heat exchanger 24 can comprise any suitable heat exchange unit that can lower the temperature of the compressed gaseous stream as necessary to promote the condensation of condensable components. The heat exchanger 24 removes a portion of the heat of reaction (e.g., polymerization reaction) from the gaseous stream (e.g., compressed gaseous steam) prior to returning such stream to the GPR 10. The cooled gaseous stream 21 can comprise a gas phase and a liquid phase, wherein the liquid phase of the cooled gaseous stream 21 comprises at least a portion of the inert condensable diluent of the gaseous stream 15. Alternatively, the gas phase portion and the liquid phase portion of cooled gaseous stream 21 can be separated and subsequently introduced as separate streams into GPR 10.

A make-up stream 19 (e.g., comprising fresh monomer and/or comonomer) can be contacted with the cooled gaseous stream 21 at point 18 to produce the recycle stream 22, wherein the reactor is operating in condensing mode and the recycle stream 22 comprises at least 3 wt. %, alternatively at least 5 wt. %, alternatively at least 7 wt. %, or alternatively at least 10 wt. % liquid phase, based on the total weight of the recycle stream. On-stream gas analyzers can determine the composition of the gaseous stream 15, compressed gaseous stream 20, cooled gaseous stream 21, or combinations thereof, thereby dictating the amount and composition of make-up stream 19 that is contacted with the cooled gaseous stream 21 to produce the recycle stream 22. As will be appreciated by one of skill in the art, and with the help of this disclosure, the composition of the make-up stream 19 can be adjusted accordingly to maintain an essentially steady-state gaseous composition within the fluidized bed 12. In an aspect, the liquid phase of the recycle stream 22 comprises at least a portion of the inert condensable diluent of the gaseous stream 15.

Fluidization of the bed 12 can be achieved by a relatively high rate of fluid recycle (e.g., recycle stream 22) to and through the bed 12, which can be usually accomplished by withdrawing the gaseous stream 15 at a relatively high flow rate, resulting in a relatively high flow rate of cooled gaseous stream 21 to a flow rate of the make-up stream 19 that is contacted with the cooled gaseous stream 21 to form the recycle stream 22, wherein the make-up stream 19 can comprise fresh monomer/comonomer and optionally inert condensable diluent. For example, a volumetric ratio of stream 21 to stream 19 can be about 50.

At least a portion of the recycle stream 22 can be introduced to the GPR 10 via (i) one or more inlets 26, wherein the one or more inlets 26 is located proximate a base of the GPR 10; (ii) one or more inlets positioned at locations other than the base of the GPR 10, such as inside the fluidized bed 12 (e.g., bed inlets), on a sidewall of the GPR 10 (e.g., sidewall inlets), or both; (iii) or combinations thereof. The GPR 10 can further comprise a deflector plate 32 preferably installed at the one or more inlets 26 to prevent polymer particles from settling out and agglomerating into a solid mass. Subsequent to entering the GPR 10, at least a portion of the recycle stream 22 can enter the fluidized bed 12 via a gas distribution plate 28. The gas distribution plate 28 can be located above at least one of the inlets of the one or more inlets 26. In passing through the fluidized bed 12, the liquid phase of the recycle stream 22 adsorbs a portion of the heat generated by the polymerization reaction, and evaporates within the fluidized bed 12, thereby providing for a fairly constant fluidized bed temperature (e.g., operating temperature). The temperature of the fluidized bed 12 is controlled at an essentially constant temperature under steady state conditions by constantly removing the heat of reaction, i.e., by evaporating the liquid phase of the recycle stream 22 within the fluidized bed 12. As will be appreciated by one of skill in the art, and with the help of this disclosure, no noticeable temperature gradient appears to exist within an upper portion of the bed. Further, as will be appreciated by one of skill in the art, and with the help of this disclosure, a fairly small temperature gradient can exist in a lower portion of the bed in a layer of about 6 to 12 inches right above the gas distribution plate 28, for example a temperature gradient of less than about 10° F., alternatively less than about 2° F., or alternatively less than about 1° F.

As will be appreciated by one of skill in the art, and with the help of this disclosure, good gas distribution plays a role in the steady state operation of the reactor in condensing mode. Further, as will be appreciated by one of skill in the art, and with the help of this disclosure, the polymer particles must be prevented from settling, for if a quiescent mass is allowed to exist, any active catalyst contained therein can continue to react and could cause fusion of the bed particles into a polymer mass or agglomerate. As such, flowing recycle fluid such as recycle stream 22 through the fluidized bed 12 at a rate sufficient to maintain fluidization through the bed is important for maintaining a steady state in condensing mode.

The gas distribution plate 28 can comprise any suitable gas distribution plate, for example a screen, slotted plate, perforated plate, a plate of the bubble-cap type, and the like, or combinations thereof. The gas distribution plate 28 should enable the recycle stream 22 to diffuse through the particles at a base of the fluidized bed 12 to keep the bed in a fluidized condition, and also serve to support a quiescent bed of polymer particles when the GPR 10 is not in operation.

The gas distribution plate 28 can have holes distributed across its surface, wherein the holes extend across an entire thickness of the plate. A deflector plate 29 can be positioned above each hole of the gas distribution plate 28, wherein the deflector plates 29 can be affixed to the gas distribution plate 28. The deflector plates 29 can serve to distribute the flow of fluid (e.g., recycle stream 22) across the surface of the plate so as to avoid stagnant zones of solids, and to prevent polymer particles from flowing through the holes of the gas distribution plate 28 when the bed is quiescent or settled. One or more screens can be placed proximate the gas distribution plate 28 (e.g., above and/or below) to prevent bed particles from passing downward through the plate and into the bottom of the reactor vessel.

The recycle stream 22 can be separated into a gas recycle stream and a liquid recycle stream prior to feeding the recycle stream 22 to the GPR 10, wherein the gas recycle stream comprises at least a portion of the gas phase of the recycle stream 22, and wherein the liquid recycle stream comprises at least a portion of the liquid phase of the recycle stream 22. The recycle stream 22 can be separated into a gas recycle stream and a liquid recycle stream by using any suitable separation device, such as for example a vapor-liquid separator. Nonlimiting examples of vapor-liquid separators suitable for use in the present disclosure include gravity separators, centrifugal separators, filter vane separators, mist eliminator pads, liquid/gas coalescers, liquid knock-out vessels, and the like, or combinations thereof. A vapor-liquid separator can comprise impingement barriers (e.g., mist eliminator pads, plates) that can use inertial impaction to separate condensed components from a gas stream. The recycle stream 22 can follow a tortuous path around these impingement barriers, while liquid droplets (e.g., condensed liquid droplets) tend to go in straighter paths, impacting these impingement barriers, thereby losing velocity, coalescing, or both, which eventually leads to the liquid droplets falling to a bottom of the vapor-liquid separator. The vapor-liquid separator could be located on recycle stream 22 between points 18 and 26.

At least a portion of the gas recycle stream can be introduced to the GPR 10 via one or more inlets 26, wherein at least one of the one or more inlets 26 is located at a base of the GPR 10. In such aspect, the gas recycle stream can travel through the gas distribution plate 28 and fluidize the bed, as previously described for the recycle stream 22.

At least a portion of the liquid recycle stream can be introduced to the fluidized bed 12 above the bottom of the fluidized bed 12 (e.g., above the gas distribution plate 28). At least a portion of the liquid recycle stream can be introduced to the GPR 10 via one or more bed inlets, via one or more sidewall inlets, or combinations thereof. In some aspects, the liquid recycle stream can be introduced to the fluidized bed 12, for example by extending into the fluidized bed the one or more bed inlets that are specifically utilized for the introduction of the liquid recycle stream. Such bed inlets could enter the GPR 10 at a base of the GPR 10, and the bed inlets could extend upward past the gas distribution plate 28, and into the fluidized bed (e.g., at a height of greater than about 0.5 feet, alternatively greater than about 1 foot, or alternatively greater than about 2 feet above the gas distribution plate 28). In other aspects, sidewall inlets could be located above the gas distribution plate 28 (e.g., at a height of greater than about 0.5 feet, alternatively greater than about 1 foot, or alternatively greater than about 2 feet above the gas distribution plate 28), and could extend inward from a sidewall of the reactor and terminate at a location within the fluidized bed, for example at a location at least about 10%, alternatively at least about 20%, or alternatively at least about 30% of the reactor diameter away from a reactor wall.

A catalyst system can be introduced to the GPR 10 via one or more injection lines 41, for example at one or more injection points 42. The one or more injection lines can comprise one, two, three, four, five, six, or more catalyst injection lines. A catalyst system can be stored in a catalyst storage tank. For example, the first catalyst system can be stored in the first catalyst storage tank 16, and the second catalyst system can be stored in the second catalyst storage tank 17. The catalyst system can be stored under a blanket of inert gas. Nonlimiting examples of inert gas suitable for use in the present disclosure include nitrogen, argon, helium, alkanes, ethane, propane, butane, isobutane, and the like, or combinations thereof.

The catalyst system (e.g., the first catalyst system, the second catalyst system, or both) can comprise any suitable catalyst for the olefin polymerization reaction that is conducted in the GPR 10. A suitable catalyst system can comprise a catalyst and, optionally, a co-catalyst (e.g., organoaluminum compound), a promoter, or both. Where appropriate, the catalyst system can comprise an activator (e.g., activator-support). Nonlimiting examples of suitable catalyst systems include but are not limited to single-site or dual-site catalysts such as Ziegler-Natta catalysts, Ziegler catalysts, chromium based catalysts, chromium catalysts, chromium oxide catalysts, chrome-silica catalysts, chrome-titania catalysts, chromocene catalysts, metallocene based catalysts, nickel catalysts, and the like, or combinations thereof. The first catalyst system in tank 16 and the second catalyst system in tank 17 can be different catalyst systems that would produce different polymer products. The catalyst system (e.g., the first catalyst system, the second catalyst system, or both) can further comprise a support. The catalyst system can comprise a Metallocene catalyst, a Ziegler-Natta catalyst, a chromium based catalyst, or combinations thereof, as will be described in more detail later herein.

Suitable metallocene based catalysts for use in the catalyst systems described herein can be any conventional or non-conventional metallocene catalyst. As used herein, the term "metallocene" is used to refer to all catalytically active metals: η-ligand complexes in which a metal is complexed by one, two, or more open chain or closed-ring η-ligands. The use of bridged bis-η-ligand metallocenes, single η-ligand "half metallocenes," and bridged η-σ ligand "scorpionate" metallocenes is contemplated in accordance with aspects of the present disclosure. The metal in such complexes can be a group 4A, 5A, 6A, 7A or 8A metal or a lanthanide or actinide of the Periodic Table of the Elements, especially a group 4A, 5A or 6A metal, more particularly Zr, Hf or Ti. The η-ligand preferably comprises $\eta^4$ or $\eta^5$ open-chain or a $\eta^5$-cyclopentadienyl ring, optionally with a ring or chain carbon replaced by a heteroatom (e.g., N, B, S or P), optionally substituted by pendant or fused ring substituents and optionally linked by bridge (e.g., a 1 to 4 atom bridge such as $(CH_2)_2$, $C(CH_3)_2$ or $Si(CH_3)_2$) to a further optionally substituted homo or heterocyclic cyclopentadienyl ring. The ring substituents can for example be halo atoms or alkyl groups optionally with carbons replaced by heteroatoms such as O, N and Si, especially Si and O and optionally substituted by mono or polycyclic groups such as phenyl or naphthyl groups. Metallocene based catalyst systems suitable for use in the present disclosure have been described, for example, in U.S. Pat. Nos. 7,163,906; 7,619,047; 7,790,820; 7,960,487; 8,138,113; 8,207,280; 8,268,944; 8,450,436; and 9,181,372; each of which is incorporated by reference herein in its entirety.

Suitable Ziegler-Natta catalysts for use in the catalysts systems described herein can be any conventional or non-conventional Ziegler-Natta catalyst. A Ziegler-Natta type polymerization catalyst is basically a complex derived from a halide (e.g., a chloride) of a transition metal, for example, titanium (Ti), vanadium (V) or hafnium (Hf), with a metal hydride, a metal alkyl, or both, typically an organoaluminum compound, as a co-catalyst. A Ziegler-Natta catalyst is usually comprised of a titanium halide supported on a magnesium compound complexed with an alkylaluminum co-catalyst. Nonlimiting examples of Ziegler-Natta catalysts suitable for use in this disclosure are described in more detail in U.S. Pat. Nos. 6,174,971 and 6,486,274; each of which is incorporated by reference herein in its entirety.

Suitable chromium based catalysts for use in the catalyst systems described herein can be any conventional or non-conventional chromium based catalysts. The chromium based catalyst can comprise a support and a chromium compound. The chromium based catalyst can comprise chromium in the hexavalent oxidation state (hereinafter chromium (VI) or Cr(VI)). The chromium compound can be one or more compounds comprising Cr(VI); comprising a material suitable for conversion to Cr(VI) (e.g., a chromium (VI) precursor); or both. The chromium compound can be a chromium (II) compound, a chromium (III) compound, or combinations thereof. Nonlimiting examples of chromium compounds suitable for use in the present disclosure include chromates, silyl chromates, bis(triphenylsilyl)chromate, tertiary butyl chromate, chromium titanates, chromium acetates, chromium nitrates, chromium carboxylates, chromium naphthenates, chromium halides, chromium pyrrolides, chromium benzoates, chromium dionates, chromium sulfates, a diarene chromium (0) compound, biscyclopentadienyl chromium(II), chromium (III) acetylacetonate, chromium oxides, chromium trioxides, chromium (III) compounds, chromium (III) sulfate, chromium (III) chloride, chromium (III) nitrate, chromic bromide, chromium (III) acetylacetonate, chromium (III) acetate, chromium (III) isooctanoate, chromium (III) naphthenate, chromium (III) tris(2-ethylhexanoate), chromic fluoride, chromium (III) oxy-2-ethylhexanoate, chromium (III) dichloroethylhexanoate, chromium (III) butyrate, chromium (III) neopentanoate, chromium (III) laurate, chromium (III) oxalate, chromium (III) benzoate, chromium (III) pyrrolide(s), chromium (III) perchlorate, chromium (III) chlorate, chromium (II) compounds, chromous fluoride, chromous chloride, chromous bromide, chromous iodide, chromium (II) sulfate, chromium (II) acetate, chromium (II) bis(2-ethylhexanoate), chromium (II) butyrate, chromium (II) neopentanoate, chromium (II) laurate, chromium (II) stearate, chromium (II) oxalate, chromium (II) benzoate, chromium (II) pyrrolide(s), chromous sulfate, biscyclopentadienyl chromium (II), and the like, or combinations thereof.

Chromium can be present in the chromium based catalyst in an amount of from about 0.1 wt. % to about 10 wt. %, alternatively from about 0.15 wt. % to about 5 wt. %, or alternatively from about 0.2 wt. % to about 2 wt. %, based on the total weight of the chromium based catalyst. Herein, the wt. % of chromium refers to the final wt. % of chromium associated with the catalyst material by total weight of the material after all processing steps used for producing the catalyst system.

The support can be present in the chromium based catalyst in an amount of from about 90 wt. % to about 99.9 wt. %, alternatively from about 95 wt. % to about 99.5 wt. %, or alternatively from about 98 wt. % to about 99.5 wt. %, based on the total weight of the chromium based catalyst. The support can comprise the remainder of the chromium based catalyst when all other components are accounted for. Chromium based catalyst systems suitable for use in the present disclosure have been described, for example, in U.S. Pat. No. 7,163,906; which is incorporated by reference herein in its entirety.

The support (e.g., first support, second support, or both) of the catalyst system can comprise an inorganic oxide, silica, alumina, silica-alumina, silica-coated alumina, aluminum phosphate, aluminophosphate, heteropolytungstate, titania, zirconia, magnesia, boria, zinc oxide, mixed oxides thereof, and the like, or combinations thereof. In an aspect, the support comprises silica. The support can be characterized by a surface area and pore volume effective to provide for the production of an active catalyst (e.g., polymerization catalyst).

The support can have a surface area in the range of from about 10 m²/g to about 1,000 m²/g, alternatively from about 50 m²/g to about 500 m²/g, or alternatively from about 200 m²/g to about 400 m²/g; a pore volume in the range of from about 0.1 cc/g to about 4.0 cc/g, alternatively from about 0.5 cc/g to about 3.5 cc/g, or alternatively from about 0.8 cc/g to about 3.0 cc/g; and an average particle size in the range of from about 5 μm to about 500 μm, alternatively from about 10 μm to about 200 μm, or alternatively from about 25 μm to about 150 μm. Generally, the average pore size of the support can range from about 10 Angstroms to about 1,000 Angstroms, alternatively from about 50 Angstroms to about 500 Angstroms, or alternatively from about 75 Angstroms to about 350 Angstroms. The support can be prepared by using any suitable methodology.

The catalyst system can comprise an activator. The activator can be a solid oxide activator-support, a chemically treated solid oxide, a clay mineral, a pillared clay, an exfoliated clay, an exfoliated clay gelled into another oxide matrix, a layered silicate mineral, a non-layered silicate mineral, a layered aluminosilicate mineral, a non-layered aluminosilicate mineral, an aluminoxane, a supported aluminoxane, an ionizing ionic compound, an organoboron compound, or any combination thereof. The terms "chemically-treated solid oxide," "solid oxide activator-support," "acidic activator-support," "activator-support," "treated solid oxide compound," and the like are used herein to indicate a solid, inorganic oxide of relatively high porosity, which exhibits Lewis acidic or Brønsted acidic behavior, and which has been treated with an electron-withdrawing component, typically an anion, and which is calcined. The electron-withdrawing component is typically an electron-withdrawing anion source compound. Thus, the chemically-treated solid oxide compound comprises the calcined contact product of at least one solid oxide compound with at least one electron-withdrawing anion source compound. Typically, the chemically-treated solid oxide comprises at least one ionizing, acidic solid oxide compound. The term "activator-support" is not used to imply this component is inert, and such component should not be construed as an inert component of the catalyst composition.

The catalyst system can further comprise a co-catalyst. Generally, a co-catalyst can be employed to activate the catalyst for the polymerization reaction (e.g., polymerization of ethylene to polyethylene). The co-catalyst can comprise an organoaluminum compound, such as for example an alkylaluminum compound. In an aspect, the organoaluminum compound can comprise a trialkylaluminum compound, wherein the trialkylaluminum compound can be represented by general formula $AlR_3$.

Nonlimiting examples of trialkylaluminum compounds suitable for use in the present disclosure include triisobutylaluminum (TiBA or TiBAl); tri-n-butylaluminum (TNBA); tri-octyl-butylaluminum (TOBA); triethylaluminum (TEA); trimethylaluminum; diethylaluminum ethoxide; diethylaluminum cyanide; other appropriate alkyl-aluminum complexes (diethylaluminum ethoxide (DEAL-E)); alkylaluminum halides (e.g., diethylaluminum chloride, diisobutylaluminum chloride, ethylaluminum sesquichloride); and the like; or combinations thereof. Additionally, partially hydrolyzed alkylaluminum compounds; aluminoxanes (e.g., methylalumoxane (MAO), modified methylalumoxane (MMAO), isobutyl alumoxanes, t-butyl alumoxanes, and the like, or mixtures thereof); or both can be used. In an aspect, the organoaluminum compound comprises a compound represented by general formula:

$$Al(X^1)_p(X^2)_q$$

wherein $X^1$ is a halide, hydrocarbyloxide group, hydrocarbylamino group, or combinations thereof; $X^2$ is a hydrocarbyl group having up to 18 carbon atoms; p ranges from 0 to 2; and q is (3−p).

As discussed in detail herein, a polymerization reactor can be transitioned from operating with a first catalyst system to operating with a second catalyst system. For example, the first catalyst system can comprise a first chromium based catalyst and the second catalyst system can comprise a second chromium based catalyst, wherein the first chromium based catalyst and the second chromium based catalyst are different. For example, the first catalyst system can comprise Cr/Al on a first support, and the second catalyst system can comprise Cr/Ti on a second support, and wherein the first support and the second support can be the same or different. For purposes of the disclosure herein, the term "Cr/Al" refers to a chromium based catalyst that utilizes an alkyl-aluminum based co-catalyst, such as for example DEAL-E. Further, for purposes of the disclosure herein, the term "Cr/Ti" refers to a chromium based catalyst comprising a titanated chromium catalyst.

The first catalyst system as disclosed herein can comprise chromium (Cr) in an amount of from about 0.1 wt. % to about 0.5 wt. %, alternatively from about 0.15 wt. % to about 0.4 wt. %, or alternatively from about 0.2 wt. % to about 0.3 wt. %, based on the total weight of the first catalyst system.

The first catalyst system can be characterized by a first catalyst particle size. The first catalyst particle size can be from about 25 microns to about 130 microns, alternatively from about 50 microns to about 115 microns, or alternatively from about 75 microns to about 100 microns. The first catalyst particle size can have a mean average of from about 85 microns to about 90 microns. As will be appreciated by one of skill in the art, and with the help of this disclosure, the first catalyst system may require no activation time (e.g., induction time) owing to the presence of the co-catalyst (e.g., alkylaluminum compound). For purposes of the disclosure herein, the mean average of the catalyst particle sizes (e.g., mean average of first catalyst particle size, mean average of second catalyst particle size) is defined as a Sauter mean diameter, wherein the Sauter mean diameter is further defined as the diameter of a sphere that has the same volume/surface area ratio as the particles of interest.

The second catalyst system as disclosed herein can comprise chromium (Cr) in an amount of from about 0.75 wt. % to about 1.25 wt. %, alternatively from about 0.85 wt. % to about 1.2 wt. %, or alternatively from about 0.9 wt. % to about 1.1 wt. %, based on the total weight of the second catalyst system. The second catalyst system can be characterized by a second catalyst particle size; wherein the second catalyst particle size is larger than the first catalyst particle size. The second catalyst particle size can be from about 60 microns to about 150 microns, alternatively from about 75 microns to about 125 microns, or alternatively from about 100 microns to about 115 microns. In some aspects, the second catalyst particle size can have a mean average of from about 105 microns to about 110 microns. In an aspect, the second catalyst system can be characterized by an activation time of from about 15 minutes to about 2 hours, or alternatively from about 20 minutes to about 1.5 hours. Without wishing to be limited by theory, the activation time of a chromium based catalyst, or more precisely, the activation time at an elevated temperature, such as the reaction temperature, increases the melt index and decreases the molecular weight of the resulting polymer at a given gas phase reactor temperature and at a given monomer (e.g., ethylene) partial pressure.

As will be appreciated by one of skill in the art, and with the help of this disclosure, the catalyst system is injected into the fluidized bed 12 at a rate equal to its consumption at the one or more injection points 42, which is located above the gas distribution plate 28. Further, as will be appreciated by one of skill in the art, and with the help of this disclosure, when more than one injection line is used for introducing a catalyst system to the fluidized bed 12, each injection line 41 will have its own corresponding point 42 of injection into the fluidized bed 12. For example, multiple injection lines could allow for introducing the catalyst system at different fluidized bed heights, at different points across a circumference of the GPR 10, or both. Preferably, the catalyst system is injected at a point in the fluidized bed 12 where good mixing of polymer particles occurs. Injecting the catalyst at a point above the distribution plate contributes to successful steady state operation of a gas phase fluidized bed olefin polymerization reactor. Since catalysts are highly active, injection of the catalyst into the area below the gas distribution plate 28 could cause polymerization to begin there and eventually cause plugging of the distribution plate. Injection into the fluidized bed, instead, aids in distributing the catalyst throughout the bed and tends to preclude the formation of localized spots of high catalyst concentration which can result in the formation of "hot spots." Injection of the catalyst above the bed could result in excessive catalyst carryover into a recycle loop (e.g., streams 15, 20, 21, 22) where polymerization can begin and plugging of the line and heat exchanger can eventually occur.

The catalyst system (e.g., the first catalyst system, the second catalyst system, or both) can be introduced to the GPR 10 by any suitable method. The catalyst system can be fed continuously to the GPR 10. An inert gas (e.g., nitrogen, argon, helium, alkanes, ethane, propane, butane, isobutane, inert condensable diluent, and the like, or combinations thereof) can be flowing through stream 41 and can be used to introduce (e.g., carry) the catalyst system into the GPR 10. The injection lines 41 generally extend inside the reactor, towards a center of the reactor and away from a reactor wall, into the fluidized bed 12. The catalyst system can be fed into the fluidized bed 12 at a location at least about 10%, alternatively at least about 20%, or alternatively at least about 30% of a reactor diameter away from the reactor wall. The catalyst system can be fed into the fluidized bed 12 at a height above the gas distribution plate 28 of less than about 50%, alternatively less than about 40%, or alternatively less than about 30% of the height of the fluidized bed 12.

As will be appreciated by one of skill in the art, and with the help of this disclosure, a rate of polymer production in the fluidized bed 12 depends on a rate of catalyst system injection and a concentration of monomer(s) in the recycle stream 22. The production rate can be conveniently controlled by simply adjusting the rate of catalyst system injection. Further, as will be appreciated by one of skill in the art, and with the help of this disclosure, since any change in the rate of catalyst system injection can change the reaction rate and hence the rate of reaction heat generation, a temperature of the recycle stream 22 entering the GPR 10, an amount of liquid phase in the recycle stream 22 entering the GPR 10, or both can be adjusted to accommodate changes in the rate of heat generation during polymerization, to ensure that the GPR operates at steady state, thereby providing for a fairly constant temperature in the fluidized bed 12. That is, the amount of liquid in the recycle stream can be changed while operating in condensing mode (e.g., 3% liquid recycle condensing mode, 5% liquid recycle condensing mode, etc.)

A polymerization product stream 44 can be withdrawn from the GPR 10. Where the catalyst system comprises the first catalyst system, the polymerization product stream 44 can comprise the first polymer product. Where the catalyst system comprises the second catalyst system, the polymerization product stream 44 can comprise a second polymer product. Where both the first catalyst system and the second catalyst system are present in the GPR 10, the polymerization product stream 44 can comprise both the first polymer product and the second polymer product (e.g., a reactor blend or bi-modal product).

The polymerization product stream 44 comprises a solid phase comprising fluidized particles (e.g., mainly polymer particles, and a small amount of catalyst particles) and a gas phase comprising unreacted monomer, optional inert condensable diluent, and inert gas. The solid phase can be separated from the gas phase to recover the polymer product, and to produce a recovered gas phase which can be recycled to the gaseous stream 15, compressed gaseous stream 20, cooled gaseous stream 21, recycle stream 22, or combinations thereof. The recovered polymer product can be further purged with an inert purge gas (e.g., nitrogen, argon, helium, alkanes, ethane, propane, butane, isobutane, and the like, or combinations thereof) to remove at least a portion of entrained volatile organic compounds, such as monomer, inert condensable diluent, etc.

An antistatic agent (antistat) can be continuously introduced to the GPR 10. The antistatic agent can be present in the GPR 10 in an amount effective to reduce, prevent, or both adherence of a polymerization product to an inner surface of a reactor wall, an inner surface of a reactor expanded section, or both. The antistatic agent can be continuously or discontinuously (e.g., intermittently) introduced to the fluidized bed 12, the reactor expanded section 14, or both. As will be appreciated by one of skill in the art, and with the help of this disclosure, the fluidized bed particles (e.g., polymer particles, catalyst particles) can have a static charge, and as such can adhere to each other, to the inner surface of the reactor wall, to the inner surface of the reactor expanded section, or combinations thereof; and the antistatic agent can prevent or minimize such events.

Nonlimiting examples of antistatic agent suitable for use in the present disclosure include an alkylamine, a hydroxylethyl alkylamine, a polyamine, a sulphonic acid, an arylsulfonic acid, benzenesulfonic acid, an alkylarylsulfonic acid, an alkylbenzenesulfonic acid, dodecylbenzenesulfonic acid, a naphthylsulfonic acid, an alkylnaphthylsulfonic acid, dinonylnaphthylsulfonic acid, a polysulfone, derivatives thereof, polymers thereof, copolymers thereof, and the like, and combinations thereof. The antistatic agent suitable for use in the present disclosure can include any suitable commercially available antistatic agent, such as STADIS 450 static dissipator additive, which reduces the risk of static discharge and electro-static ignition at minimal treat rates; and STATSAFE 6000 antistatic additive, which has food grade approval for polyolefin use and is also suitable for pharmaceutical use; both of which are available from Innospec.

The antistatic agent can be introduced to the GPR 10 in liquid form, for example as a solution in an aromatic hydrocarbon solvent (e.g., benzene, toluene, naphtha solvent, petroleum, etc.).

A first expanded section amount of antistatic agent can be continuously introduced to the reactor expanded section 14, and a first bed amount of antistatic agent can be continuously introduced to the fluidized bed 12, during the step of operating the gas phase fluidized bed olefin polymerization reactor in condensing mode under steady state conditions in the presence of the first catalyst system.

A weight ratio between the first bed amount and the first expanded section amount can be from about 1:1 to about 10:1, alternatively from about 1.5:1 to about 7.5:1, or alternatively from about 2:1 to about 5:1, wherein the first bed amount and the first expanded section amount are based on the weight of the fresh olefin monomer of make-up stream 19 contacted with at least a portion of the cooled gaseous stream 21 to form the recycle stream 22.

A total amount of antistatic agent introduced to the GPR 10 (i.e., the sum of the first expanded section amount and the first bed amount) can be from about 5 ppm to about 20 ppm, alternatively from about 7 ppm to about 15 ppm, or alternatively from about 7.5 ppm to about 12.5 ppm, based on the weight of the fresh monomer of make-up stream 19 contacted with at least a portion of the cooled gaseous stream 21 to form the recycle stream 22.

The antistatic agent can be introduced to the reactor expanded section 14 via a port or inlet. The antistatic agent can be introduced to the fluidized bed 12 via an injection line located above the gas distribution plate 28. The antistatic agent can be introduced to the fluidized bed 12 via one or more of the catalyst injection lines 41. The injection line can extend inside the GPR 10, for example the antistatic agent can be fed into the fluidized bed 12 at a location at least about 10%, alternatively at least about 20%, or alternatively at least about 30% of a reactor diameter away from the reactor wall. The antistatic agent can be fed into the fluidized bed 12 at a height above the gas distribution plate 28 of less than about 50%, alternatively less than about 40%, or alternatively less than about 30% of the height of the fluidized bed 12.

The GPR 10 can be operated at pressures of up to about 1000 psi, alternatively from about 50 psi to about 500 psi, or alternatively from about 100 psi to about 350 psi.

The monomer can be characterized by a first monomer partial pressure, during the step of operating the gas phase fluidized bed olefin polymerization reactor in condensing mode under steady state conditions in the presence of the first catalyst system. The first monomer partial pressure can be from about 100 psia to about 400 psia, alternatively from about 110 psia to about 300 psia, or alternatively from about 125 psia to about 200 psia.

Operating the gas phase fluidized bed olefin polymerization reactor in condensing mode under steady state conditions in the presence of the first catalyst system can occur at a first fluidized bed temperature. The first fluidized bed temperature can be less than about 200° F., alternatively less than about 195° F., or alternatively less than about 190° F. As will be appreciated by one of skill in the art, and with the help of this disclosure, the fluidized bed temperature is dependent upon a variety of factors, such as the catalyst system used, the desired polymer product properties, etc.

Hydrogen ($H_2$) can be introduced to the GPR 10 for example at a hydrogen partial pressure of from about 5 psi to about 50 psi, alternatively from about 7.5 psi to about 30 psi, or alternatively from about 10 psi to about 20 psi. For example, hydrogen can be introduced to the GPR 10 while the second catalyst system is present in the reactor. As will be appreciated by one of skill in the art, and with the help of this disclosure, the hydrogen, in addition to the reaction temperature, is used to control the molecular weight of the resulting polymer. Without wishing to be limited by theory, the second catalyst system has a response to $H_2$, i.e., $H_2$ lowers the molecular weight of the resulting polymer. Further, without wishing to be limited by theory, the molecular weight response to $H_2$ is proportional to the partial pressure of $H_2$ in the reactor; for example, if there was no $H_2$ in the reactor when using the second catalyst system, the melt index of the resulting polymer would be lower than the melt index of a polymer produced in the presence of the $H_2$.

Oxygen ($O_2$) can be introduced to the GPR 10 for example at a oxygen concentration of from about 5 parts per billion (ppb) to about 50 ppb, alternatively from about 7.5 ppb to about 30 ppb, or alternatively from about 10 ppb to about 20 ppb, based on the weight of monomer (e.g., ethylene) flow to the reactor. For example, oxygen can be introduced to the GPR 10 while the second catalyst system is present in the reactor. As will be appreciated by one of skill in the art, and with the help of this disclosure, the presence of molecular oxygen in the reactor helps control the molecular weight distribution of the resulting polymer. Without wishing to be limited by theory, the presence of $O_2$ increases the molecular weight distribution of the resulting polymer.

A method of transitioning from a first catalyst system to a second catalyst system in a gas phase fluidized bed olefin polymerization reactor can comprise discontinuing the introduction of the first catalyst system to the gas phase fluidized bed reactor while continuing to feed the recycle stream to the gas phase fluidized bed reactor. For example, the condensing mode can be maintained at a level of at least 3 wt. % liquid phase in the recycle stream, based on the total weight of the recycle stream, at the first fluidized bed temperature; while discontinuing the introduction of the first catalyst system; while continuing to introduce the first expanded section amount of antistatic agent to the reactor expanded section and the first bed amount of antistatic agent to the fluidized bed; and while continuing to withdraw a polymerization product stream from the gas phase fluidized bed reactor, wherein the polymerization product stream comprises the first polymer product. Discontinuing the introduction of the first catalyst system to the gas phase fluidized bed reactor can occur at a first monomer partial pressure.

A method of transitioning from a first catalyst system to a second catalyst system in a gas phase fluidized bed olefin polymerization reactor can comprise maintaining the condensing mode in the gas phase fluidized bed reactor at a level of at least 3 wt. % liquid phase in the recycle stream, based on the total weight of the recycle stream for a first time period at the first fluidized bed temperature; while no fresh catalyst system is introduced to the gas phase fluidized bed reactor; while continuing to introduce the first expanded section amount of antistatic agent to the reactor expanded section and the first bed amount of antistatic agent to the fluidized bed; and while continuing to withdraw a polymerization product stream from the gas phase fluidized bed reactor, wherein the polymerization product stream comprises the first polymer product.

The first time period can be an amount of time effective to reduce an amount of first catalyst system in the gas phase fluidized bed reactor by at least about 10%, alternatively by at least about 20%, or alternatively by at least about 25%, when compared to an amount of the first catalyst system in the gas phase fluidized bed reactor during the step of continuously feeding the first catalyst system and a recycle stream comprising an olefin monomer to the gas phase fluidized bed reactor. The first time period can be from about 5 minutes to about 1 hour, alternatively about 10 minutes to about 50 minutes, or alternatively about 15 minutes to about 30 minutes.

During the first time period, the one or more injection lines for continuously introducing the first catalyst system to the gas phase fluidized bed reactor can be flushed with an inert gas for a time period of equal to or less than about the first time period. For example, the one or more injection lines for continuously introducing the first catalyst system to the gas phase fluidized bed reactor can be flushed with an inert gas for the entire first time period, to ensure that the first catalyst system and the second catalyst system are not present simultaneously in the injection lines.

During the first time period, the olefin monomer can be characterized by a second monomer partial pressure, wherein the second monomer partial pressure is less than the first monomer partial pressure (e.g., the monomer partial pressure during a step of continuously feeding the first catalyst system and a recycle stream comprising an olefin monomer to the gas phase fluidized bed reactor). The second monomer partial pressure can be from about 50 psi to about 250 psi, alternatively from about 75 psi to about 200 psi, or alternatively from about 90 psi to about 130 psi. As will be appreciated by one of skill in the art, and with the help of this disclosure, the monomer partial pressure can be reduced by controlling (e.g., lowering) the amount of fresh monomer introduced to the recycle stream. Further, as will be appreciated by one of skill in the art, and with the help of this disclosure, during the first time period, the lower monomer partial pressure is obtained by gradually decreasing the amount of fresh monomer introduced to the reactor; e.g., via the recycle stream.

A difference between the first monomer partial pressure and the second monomer partial pressure can be equal to or greater than about 25 psi, alternatively equal to or greater than about 40 psi, or alternatively equal to or greater than about 50 psi.

A method of transitioning from a first catalyst system to a second catalyst system in a gas phase fluidized bed olefin polymerization reactor can comprise introducing the second catalyst system to the gas phase fluidized bed reactor after the first time period, wherein the gas phase fluidized bed reactor is operating in condensing mode, and wherein the condensing mode is maintained at a level of at least 3 wt. % liquid phase in the recycle stream, based on the total weight of the recycle stream. The second catalyst system can be introduced to the gas phase fluidized bed reactor at the first fluidized bed temperature and at a first flow rate for a second time period. The second catalyst system can be introduced to the gas phase fluidized bed reactor via the one or more flushed injection lines.

The second time period can be an amount of time effective to reduce an amount of first catalyst system in the gas phase fluidized bed reactor by at least about 95%, alternatively by at least about 97%, or alternatively by at least about 99%, when compared to an amount of the first catalyst system in the gas phase fluidized bed reactor during the step of continuously feeding the first catalyst system and a recycle stream comprising an olefin monomer to the gas phase fluidized bed reactor. The second time period can be from about 2 hours to about 12 hours, alternatively from about 3 hours to about 10 hours, or alternatively from about 4 hours to about 8 hours. As will be appreciated by one of skill in the art, and with the help of this disclosure, the amount of the first catalyst system in the reactor during the second time period is consumed entirely or almost entirely, while continuing to feed the second catalyst system to the reactor, such that the condensing mode can be maintained.

A portion of the olefin monomer can contact the second catalyst in the fluidized bed of the reactor and can undergo an exothermic polymerization reaction to produce a second polymer product. Introducing the second catalyst system to the gas phase fluidized bed reactor during the second time period can comprise withdrawing a polymerization product stream from the gas phase fluidized bed reactor, wherein the polymerization product stream comprises the first polymer product and the second polymer product. As will be appreciated by one of skill in the art, and with the help of this disclosure, while the first catalyst system inventory is being reduced during the second time period, the first catalyst system present in the reactor during the second time period will still produce the first polymer product, and such first polymer product produced during the second time period will be present in the polymerization product stream recovered from the reactor, along with the second polymer product.

A bed amount of antistatic agent can be increased from the first bed amount of antistatic agent to a second bed amount of antistatic agent during a first portion of the second time period, while continuing to introduce the first expanded section amount of antistatic agent to the reactor expanded section. For example, the bed amount of antistatic agent can be increased during the first half of the second time period.

An expanded section amount of antistatic agent can be decreased from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount can be about the same as a sum of the second expanded section amount and the second bed amount. For example, the expanded section amount of antistatic agent can be decreased during the second half of the second time period. Without wishing to be limited by theory, the static in the expanded section of the reactor in the presence of the first catalyst system is higher than in the presence of the second catalyst system, owing to the first catalyst system having a smaller particle size than the second catalyst system, and as such, the first catalyst system requires a higher amount of antistatic agent in the expanded section as compared to the second catalyst system. As the amount of the first catalyst system in the reactor decreases, the amount of antistatic agent in the expanded section can be decreased as well.

The first portion of the second time period and the second portion of the second time period can be consecutive. For example, the second portion of the second time period can begin when the first portion of the second time period ends. A sum of the first portion of the second time period and the second portion of the second time period can be about the same as the second time period.

Alternatively, the first portion of the second time period and the second portion of the second time period are not consecutive. For example, the second time period can comprise a third portion of the second time period, wherein during the third portion of the second time period the second bed amount of antistatic agent is continuously introduced to the fluidized bed of the reactor and the first expanded section amount of antistatic agent is continuously introduced to the reactor expanded section; wherein the third portion of the second time period begins when the first portion of the second time period ends; and wherein the second portion of the second time period begins when the third portion of the second time period ends. As will be appreciated by one of skill in the art, and with the help of this disclosure, during the third portion, as well as at the end of the first portion and at the beginning of the second portion of the second time period, a total amount of antistatic agent in the reactor (e.g., a sum of the bed amount and the expanded section amount) is greater than a total amount of antistatic agent in the reactor during the first time period and after the second time period. Without wishing to be limited by theory, an increased total amount of antistatic agent in the reactor helps reduce, prevent, or both adherence of a polymerization product to an inner surface of a reactor wall, an inner surface of a reactor expanded section, or both.

A weight ratio between the second bed amount and the second expanded section amount can be from about 10:1 to about 30:1, alternatively from about 12.5:1 to about 25:1, or alternatively from about 15:1 to about 20:1, wherein the second bed amount and the second expanded section amount are based on the weight of the fresh olefin monomer contacted with at least a portion of the cooled gaseous stream to form the recycle stream.

A method of transitioning from a first catalyst system to a second catalyst system in a gas phase fluidized bed olefin polymerization reactor can comprise increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed. The second catalyst system can be introduced to the gas phase fluidized bed reactor at the second fluidized bed temperature and at a second flow rate, wherein the second flow rate of the second catalyst system is greater than the first flow rate of the second catalyst system. As will be appreciated by one of skill in the art, and with the help of this disclosure, the methods disclosed herein for transitioning from the first catalyst system to the second catalyst system attempt to minimize the overlap of inventory of the first catalyst system and inventory of the second catalyst system in the reactor, for example by minimizing the second catalyst flow rate into the reactor to a level where the condensing more could still be maintained during the second time period. Further, as will be appreciated by one of skill in the art, and with the help of this disclosure, after the second time period, there is essentially no more first catalyst system in the reactor, and as such the flow rate of the second catalyst system can be increased to a level that corresponds to a steady state operating of the reactor, e.g., the second flowrate of the second catalyst system.

A ratio of the second flow rate to the first flow rate of the second catalyst system can be from about 1.35:1 to about 1.8:1, alternatively from about 1.4:1 to about 1.75:1, or alternatively from about 1.45:1 to about 1.7:1.

The fluidized bed temperature can be increased from the first fluidized bed temperature to the second fluidized bed temperature at a rate of from about 0.1° F./hour to about 4° F./hour, alternatively from about 0.5° F./hour to about 3° F./hour, or alternatively from about 1° F./hour to about 2.5° F./hour.

A difference between the first fluidized bed temperature and the second fluidized bed temperature can be equal to or greater than about 5° F., alternatively equal to or greater than about 7.5° F., or alternatively equal to or greater than about 10° F.

The second fluidized bed temperature can be equal to or greater than about 200° F., alternatively equal to or greater than about 205° F., or alternatively equal to or greater than about 210° F. As will be appreciated by one of skill in the art, and with the help of this disclosure, the second catalyst system has generally a higher activity than the first catalyst system, owing in part to a higher Cr content of the second catalyst system, as compared to the first catalyst system. Further, the second catalyst system results in a better (e.g., higher) polymer production at the second fluidized bed temperature (as opposed to the first fluidized bed temperature), and as such, maintaining the temperature at the level of the first fluidized bed temperature during the second time period, coupled with the first flow rate of the second catalyst system, allows for a reduced activity of the second catalyst system in the reactor, while allowing for reducing the first catalyst system inventory. Once the first catalyst system is eliminated from the reactor, the operating parameters of the reactor can be adjusted to allow for optimum performance of the second catalyst system (e.g., second fluidized bed temperature, second flow rate of the second catalyst system) to maximize the rate of production of the second polymer product.

The olefin monomer can be characterized by the second monomer partial pressure after the second time period. As will be appreciated by one of skill in the art, and with the help of this disclosure, since the second catalyst system is more active than the first catalyst system, the monomer partial pressure can be lower in the presence of the second catalyst system.

A polymerization product stream can be withdrawn from the gas phase fluidized bed reactor while the fluidized bed is characterized by the second fluidized bed temperature, wherein the polymerization product stream can consist essentially of the second polymer product.

Where the olefin monomer comprises ethylene, the polymerization product stream can comprise polyethylene. Where the first catalyst system comprises Cr/Al on a first support as previously described herein and where the olefin monomer comprises ethylene, the first polymer product can comprise a first polyethylene product. Where the second catalyst system comprises Cr/Ti on a second support as previously described herein and where the olefin monomer comprises ethylene, the second polymer product can comprise a second polyethylene product.

The first polyethylene product can be characterized by a first weight average molecular weight and the second polyethylene product can be characterized by a second weight average molecular weight, wherein the first weight average molecular weight can be greater than the second weight average molecular weight. Without wishing to be limited by theory, since the second catalyst system is more active than the first catalyst system, the second catalyst system will promote the formation of more polymer chains, which consequently will be shorter, i.e., have a lower molecular weight.

The first polyethylene product can be characterized by a high load melt index (HLMI) of from about 5 g/10 min to about 15 g/10 min, alternatively from about 7 g/10 min to about 12.5 g/10 min, or alternatively from about 8 g/10 min to about 10 g/10 min, under a force load of 21,600 grams, as determined in accordance with ASTM D1238. The HLMI represents the rate of flow of a molten resin through an orifice of 0.0825 inch diameter when subjected to a force of 21.6 kg in 10 minutes at 190° C., as determined in accordance with ASTM D1238.

The first polyethylene product can be characterized by density of from about 0.940 g/cc to about 0.950 g/cc, alternatively from about 0.942 g/cc to about 0.948 g/cc, or alternatively from about 0.945 g/cc to about 0.947 g/cc, as determined in accordance with ASTM D1505.

The second polyethylene product can be characterized by a melt index (MI) of from about 0.1 g/10 min to about 1 g/10 min, alternatively from about 0.2 g/10 min to about 0.7 g/10 min, or alternatively from about 0.25 g/10 min to about 0.4 g/10 min, under a force load of 2,160 grams, as determined in accordance with ASTM D1238. The MI represents the rate of flow of a molten resin through an orifice of 0.0825 inch diameter when subjected to a force of 2.16 kg in 10 minutes at 190° C., as determined in accordance with ASTM D1238.

The second polyethylene product can be characterized by density of from about 0.940 g/cc to about 0.950 g/cc, alternatively from about 0.944 g/cc to about 0.949 g/cc, or alternatively from about 0.946 g/cc to about 0.948 g/cc, as determined in accordance with ASTM D1505. The density of the second polyethylene product can be greater than the density of the first polyethylene product.

The first polyethylene product can be characterized by a first molecular weight distribution and the second polyethylene product can be characterized by a second molecular weight distribution, wherein the first molecular weight distribution can be broader than the second molecular weight distribution. The molecular weight distribution of a polymer, also known as the polydispersity index, can generally be used as a measure of the broadness of a molecular weight distribution of a polymer. The larger the molecular weight distribution, the broader the molecular weight.

The first polyethylene product can be characterized by a first molecular weight distribution of from about 15 to about 18, alternatively from about 15.5 to about 17.5, or alternatively from about 16 to about 17. The first polyethylene product can be used for manufacturing a variety of polymeric products, such as polyethyelene pipes, wherein the pipes could be used for transporting liquids (e.g., water) or pressurized gases (e.g., natural gas).

The second polyethylene product can be characterized by a second molecular weight distribution of from about 8 to about 12, alternatively from about 8.5 to about 11, alternatively from about 9 to about 11, or alternatively from about 9 to about 10.5. The second polyethylene product can be used for manufacturing a variety of polymeric products, such as blow molding articles (e.g., plastic bottles, plastic containers, etc.).

A method of transitioning from a first catalyst system to a second catalyst system in a gas phase fluidized bed ethylene polymerization reactor can comprise the steps of (a) continuously feeding the first catalyst system and a recycle stream comprising ethylene and isopentane to the gas phase fluidized bed reactor; wherein a portion of the ethylene contacts the first catalyst in the fluidized bed of the reactor and undergoes an exothermic polymerization reaction to produce a first polyethylene product; wherein the gas phase fluidized bed reactor comprises a reactor expanded section, wherein the reactor expanded section is located above the fluidized bed; wherein the condensing mode comprises: (i) withdrawing a gaseous stream from the gas phase fluidized bed reactor, wherein the gaseous stream comprises unreacted ethylene, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh ethylene to form the recycle stream; and wherein upon being fed to the reactor the liquid phase of the recycle stream adsorbs a portion of the heat generated by the polymerization reaction and evaporates within the fluidized bed; wherein the gas phase fluidized bed reactor is operating in condensing mode; wherein the condensing mode is maintained at a level of at least 7 wt. % liquid phase in the recycle stream, based on the total weight of the recycle stream; wherein from about 1 ppm to about 5 ppm of antistatic agent, based on the weight of the fresh ethylene introduced to the recycle stream is continuously introduced to the reactor expanded section; wherein from about 5 ppm to about 10 ppm of antistatic agent, based on the weight of the fresh ethylene introduced to the recycle stream is continuously introduced to the fluidized bed; wherein the gas phase fluidized bed reactor is characterized by a first fluidized bed temperature of less than about 200° F.; wherein the first catalyst system comprising Cr/Al on silica is characterized by a first catalyst particle size of from about 75 microns to about 100 microns; wherein the first catalyst system comprises chromium in an amount of from about 0.15 wt. % to about 0.3 wt. %, based on the total weight of the first catalyst system; and wherein the first polyethylene product has a first molecular weight distribution of from about 16 to about 17; (b) discontinuing the introduction of the first catalyst system to the gas phase fluidized bed reactor while continuing to feed the recycle stream to the gas phase fluidized bed reactor, while continuing to introduce from about 1 ppm to about 5 ppm of antistatic agent to the reactor expanded section and from about 5 ppm to about 10 ppm of antistatic agent to the fluidized bed, based on the weight of the fresh ethylene introduced to the recycle stream, and while continuing to produce the first polyethylene product; (c) maintaining the condensing mode in the gas phase fluidized bed reactor at a level of at least 7 wt. % liquid phase in the recycle stream, based on the total weight of the recycle stream for a first time period of from about 15 minutes to about 30 minutes at the first fluidized bed temperature while no fresh catalyst system is introduced to the gas phase fluidized bed reactor, while continuing to feed the recycle stream to the gas phase fluidized bed reactor, while continuing to introduce from about 1 ppm to about 5 ppm of antistatic agent to the reactor expanded section and from about 5 ppm to about 10 ppm of antistatic agent to the fluidized bed, based on the weight of the fresh ethylene introduced to the recycle stream, and while continuing to produce the first polyethylene product; (d) introducing the second catalyst system to the gas phase fluidized bed reactor after the first time period; wherein the gas phase fluidized bed reactor is operating in condensing mode at a level of at least 7 wt. % liquid phase in the recycle stream, based on the total weight of the recycle stream; wherein a portion of the ethylene contacts the second catalyst in the fluidized bed of the reactor and undergoes an exothermic polymerization reaction to produce a second polyethylene product, wherein the second polyethylene product has a second molecular weight distribution of from about 9 to about 11; wherein the gas phase fluidized bed reactor is operating at the first fluidized bed temperature for a second time period of from about 4 hours to about 8 hours, while continuing to produce the first polyethylene product; wherein the second catalyst system comprising Cr/Ti on silica is characterized by a second catalyst particle size of from about 100 microns to about 115 microns; and wherein the second catalyst system comprises chromium in an amount of from about 0.9 wt. % to about 1.1 wt. %, based on the total weight of the second catalyst system; (e) increasing a bed amount of antistatic agent to from about 8 ppm to about 11 ppm, based on the weight of the fresh ethylene introduced to the recycle stream during a first portion of the second time period, while continuing to introduce from about 1 ppm to about 5 ppm of antistatic agent to the reactor expanded section, based on the weight of the fresh ethylene introduced to the recycle stream, and while continuing to produce the first polyethylene product; (f) decreasing an expanded section amount of antistatic agent to from about 0.1 ppm to about 1.5 ppm, based on the weight of the fresh ethylene introduced to the recycle stream during a second portion of the second time period, while continuing to introduce from about 8 ppm to about 11 ppm antistatic agent to the fluidized bed, based on the weight of the fresh ethylene introduced to the recycle stream; and (g) increasing a fluidized bed temperature from the first fluidized bed temperature to a second fluidized bed temperature of equal to or greater than about 200° F. at the end of the second time period, while maintaining the condensing mode at a level of at least 7 wt. % liquid phase in the recycle stream, based on the total weight of the recycle stream, while continuing to introduce from about 0.1 ppm to about 1.5 ppm of antistatic agent to the reactor expanded section and from about 8 ppm to about 11 ppm of antistatic agent to the fluidized bed, based on the weight of the fresh ethylene introduced to the recycle stream, and while continuing to produce the second polyethylene product.

One or more of the disclosed methods of transitioning from a first catalyst system to a second catalyst system in a gas phase fluidized bed olefin polymerization reactor can advantageously display improvements in one or more method characteristics, when compared to otherwise similar methods used conventionally for transitioning from a first catalyst system to a second catalyst system in a gas phase fluidized bed olefin polymerization reactor. A method of transitioning from a first catalyst system to a second catalyst system in a gas phase fluidized bed olefin polymerization reactor as disclosed herein can advantageously allow for an increased on stream time, due to reducing or eliminating the formation of polymer agglomerates during the transition from the first catalyst system to the second catalyst system. The productivity of the gas phase fluidized bed olefin polymerization reactor can be increased by eliminating or reducing downtime.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

EXAMPLES

The disclosure having been generally described, the following examples demonstrate the practice and advantages thereof. It is understood that the examples are given by way of illustration and are not intended to limit the specification of the claims to follow in any manner.

In the examples presented herein, the performance of a gas phase reactor used for polyethylene production was investigated for a conventional method of transitioning between a first catalyst system comprising silica supported Cr/Al (particle size of about 60 microns) to a second catalyst system comprising silica supported Cr/Ti (particle size of about 100 microns) (Examples 1 and 2); as compared to a method of transitioning from the first catalyst system comprising Cr/Al to the second catalyst system comprising Cr/Ti according to the methods disclosed herein (Examples 3, 4, and 5). In the conventional method (Examples 1 and 2), the second catalyst system was introduced to the gas phase reactor along (concurrently) with the first catalyst system for a time period of 15-30 minutes, in order to transition from the first catalyst system to the second catalyst system. According to the methods disclosed herein (Examples 3, 4, and 5), the second catalyst system was introduced to the gas phase reactor after the introduction of the first catalyst system was discontinued for 15-30 minutes. In the conventional method (Examples 1 and 2), the second catalyst system was introduced to the gas phase reactor at the same flow rate, regardless of whether the first catalyst system was present in the reactor or not at the time the second catalyst system was being introduced to the reactor. According to the method disclosed herein (Examples 3, 4, and 5), the second catalyst system was introduced to the gas phase reactor at a first flow rate of 14 pounds/hr while the first catalyst system was present in the reactor, and at a second flow rate of 26 pounds/hr once the first catalyst system had been substantially or completely removed from the reactor. Catalyst was added to the reactor via a catalyst injection system using high pressure nitrogen as a carrier gas. Each catalyst injection contained about 0.11 pounds of catalyst. Antistatic agent was added to the reactor by diluting the antistatic agent in isopentane and by using nitrogen pressure to add to the reactor. The addition rate of the antistatic agent was controlled by adjusting the flow of antistatic agent in order to add the desired amount of parts per million by weight of antistatic agent on an ethylene feed basis.

The same reactor was used to acquire the data for all of the examples (Examples 1, 2, 3, 4, and 5). The reactor was a commercial fluidized bed reactor (such as gas phase reactor 10 in FIG. 1) producing high density polyethylene. The reactor had a typical fluidized bed volume of 10,150 cubic feet (such as a volume of the fluidized bed 12 in FIG. 1). The operating pressure was nominally 300 psig. In each of the examples, the reactor was transitioned from producing a first polymer product (e.g., a first copolymer product) having a density of 0.9465 g/cc and a high load melt index (HLMI) of 11.0 g/10 min to producing a second polymer product (e.g., a second copolymer product) having a density of 0.9460 g/cc and a melt index (MI) of 0.31 g/10 min. Both polymer products were hexene copolymers.

The reactor temperature was measured by a resistance temperature detector (RTD) at 65 feet above the gas distribution plate or tray (such as the gas distribution plate 28 in FIG. 1). The gas distribution plate temperatures were measured by thermocouples in thermowells 18 inches above the gas distribution plate. Static (e.g., antistatic agent levels) was measured in the recycle piping (such as piping used for streams 15, 20, 21, and 22 in FIG. 1) using static probes. Percent condensation was measured using a liquid flowmeter and then it was calculated the percent of recycle fluid on a mass basis that was condensed to liquid. The fluidized bed height was measured via differential pressure with pressure measuring tapes at 50, 55, 60 and 65 feet above the gas distribution plate.

Table 1 summarizes some experimental details for Examples 1-5.

TABLE 1

Figure 2A:
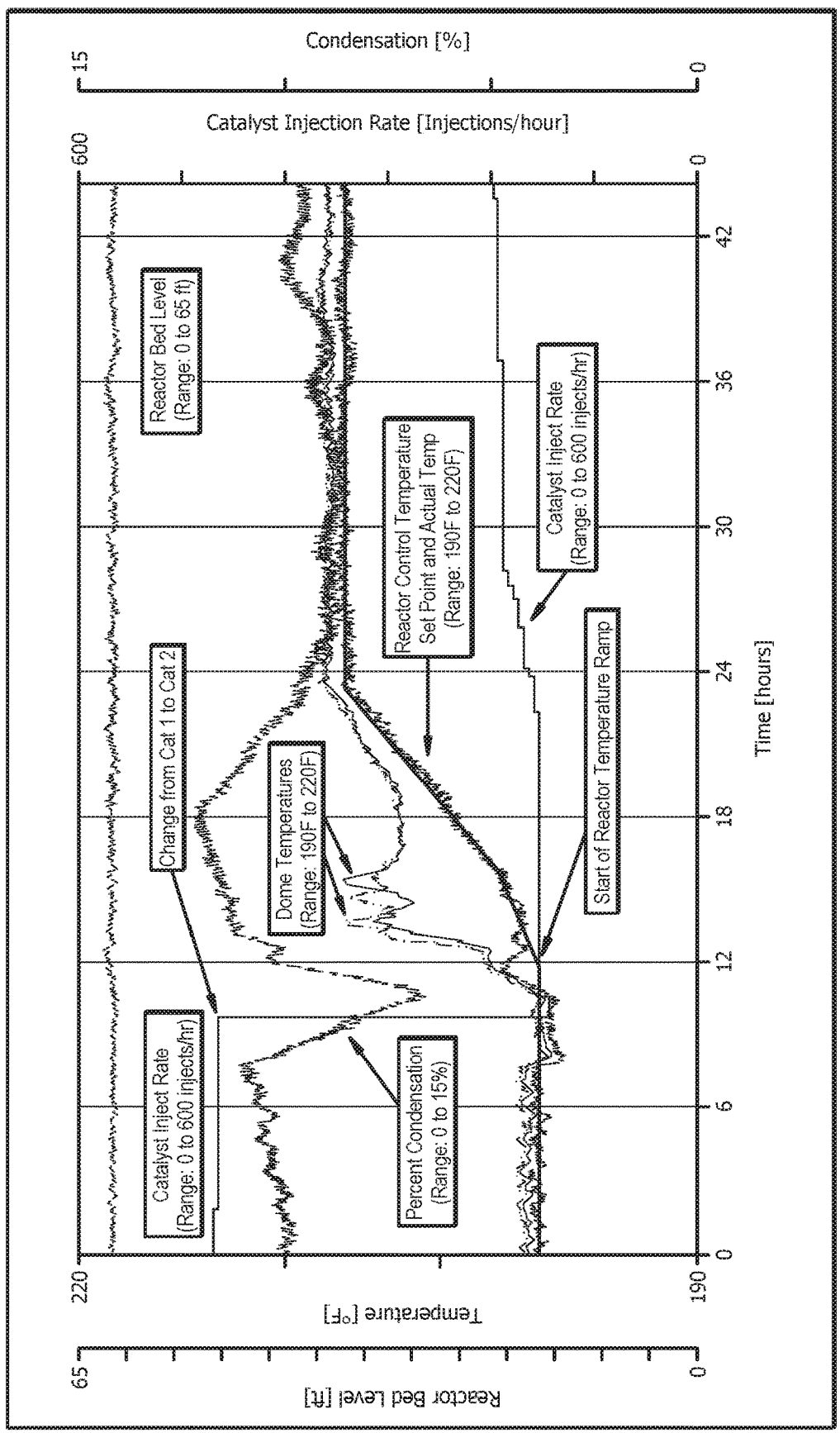
FIG. 2A displays a graph of temperature profiles inside a gas phase reactor operated conventionally for Example 1.
Figure 3A:
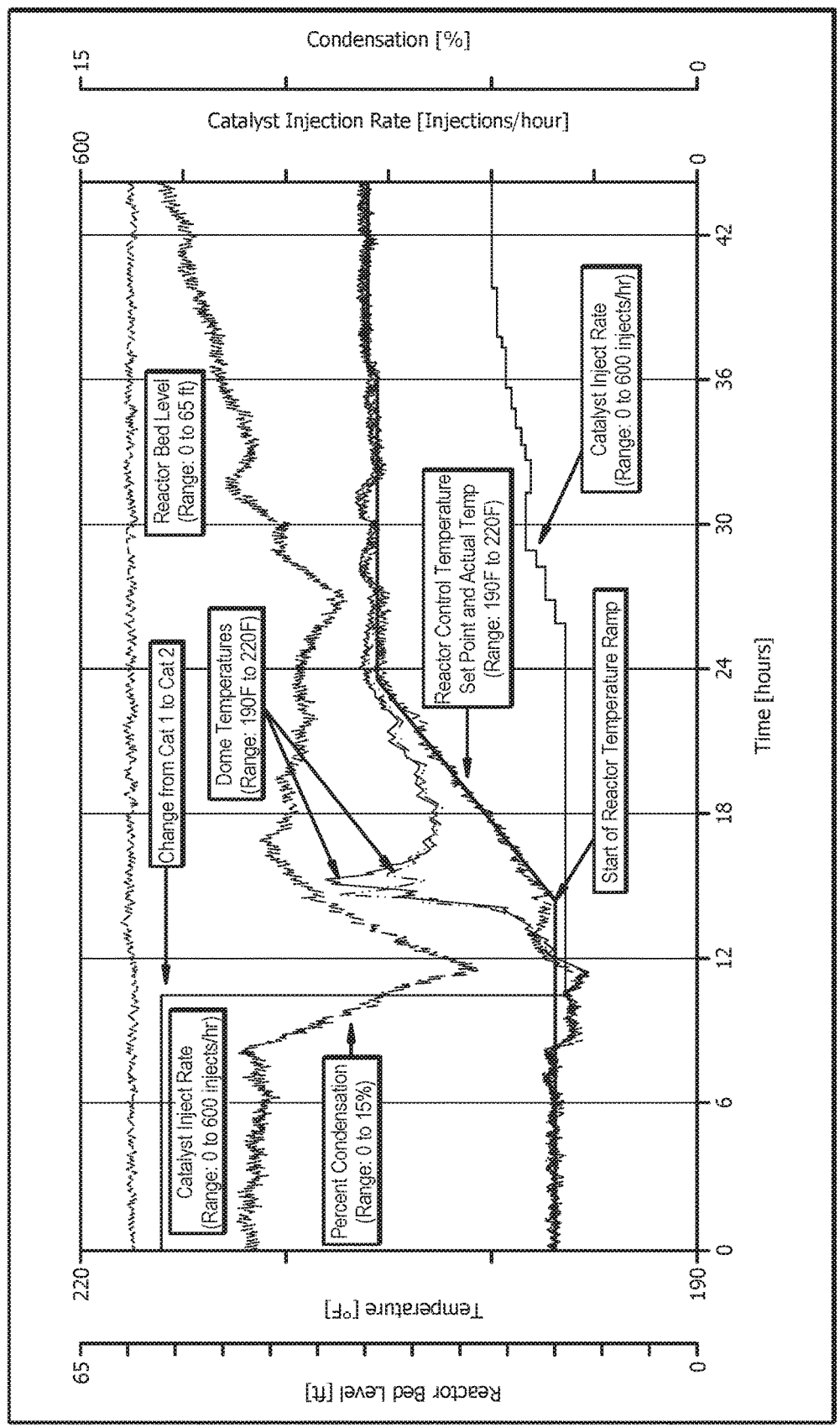
FIG. 3A displays a graph of temperature profiles inside a gas phase reactor operated conventionally for Example 2.
Figure 4A:
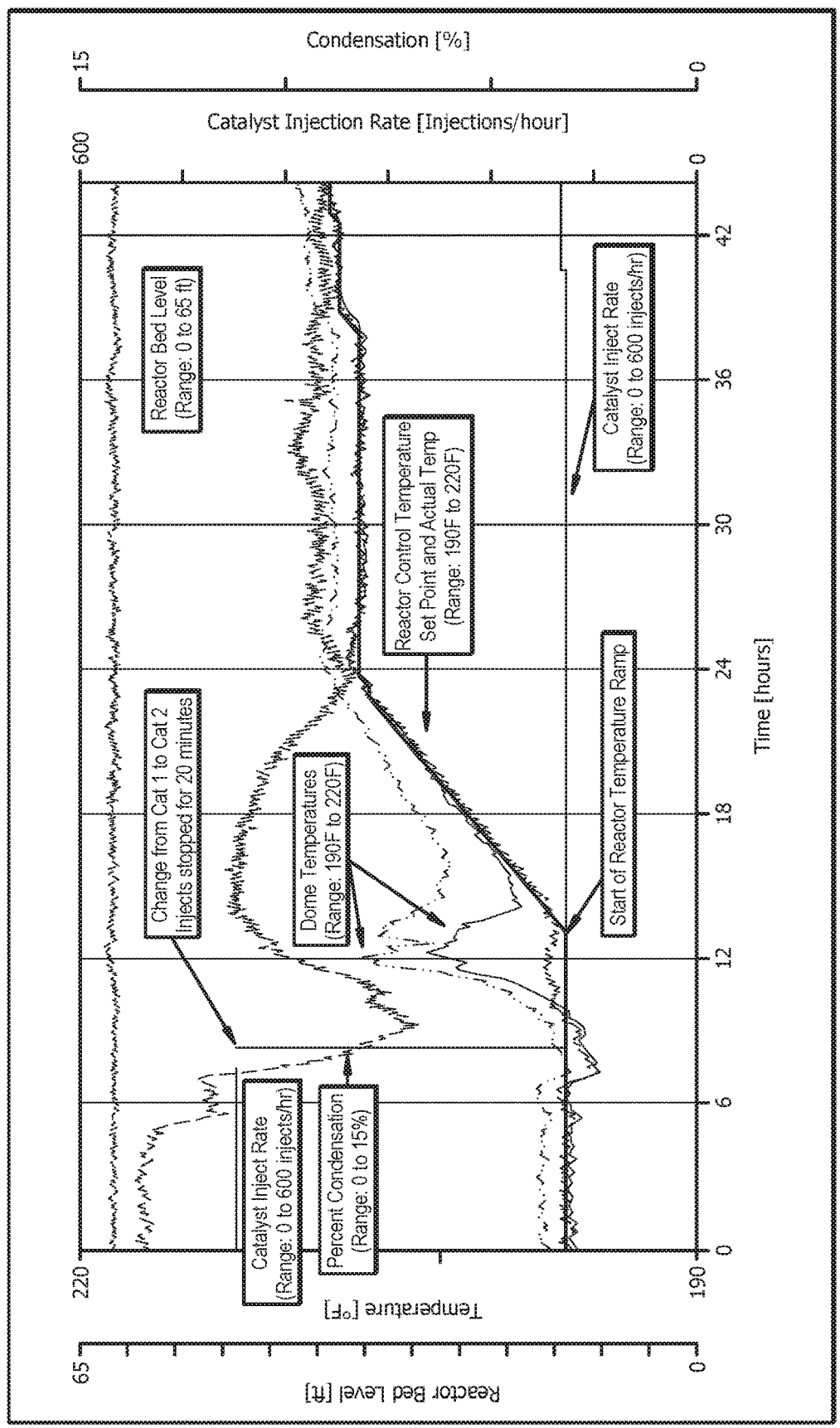
FIG. 4A displays a graph of temperature profiles inside a gas phase reactor operated conventionally for Example 3.
Figure 5A:
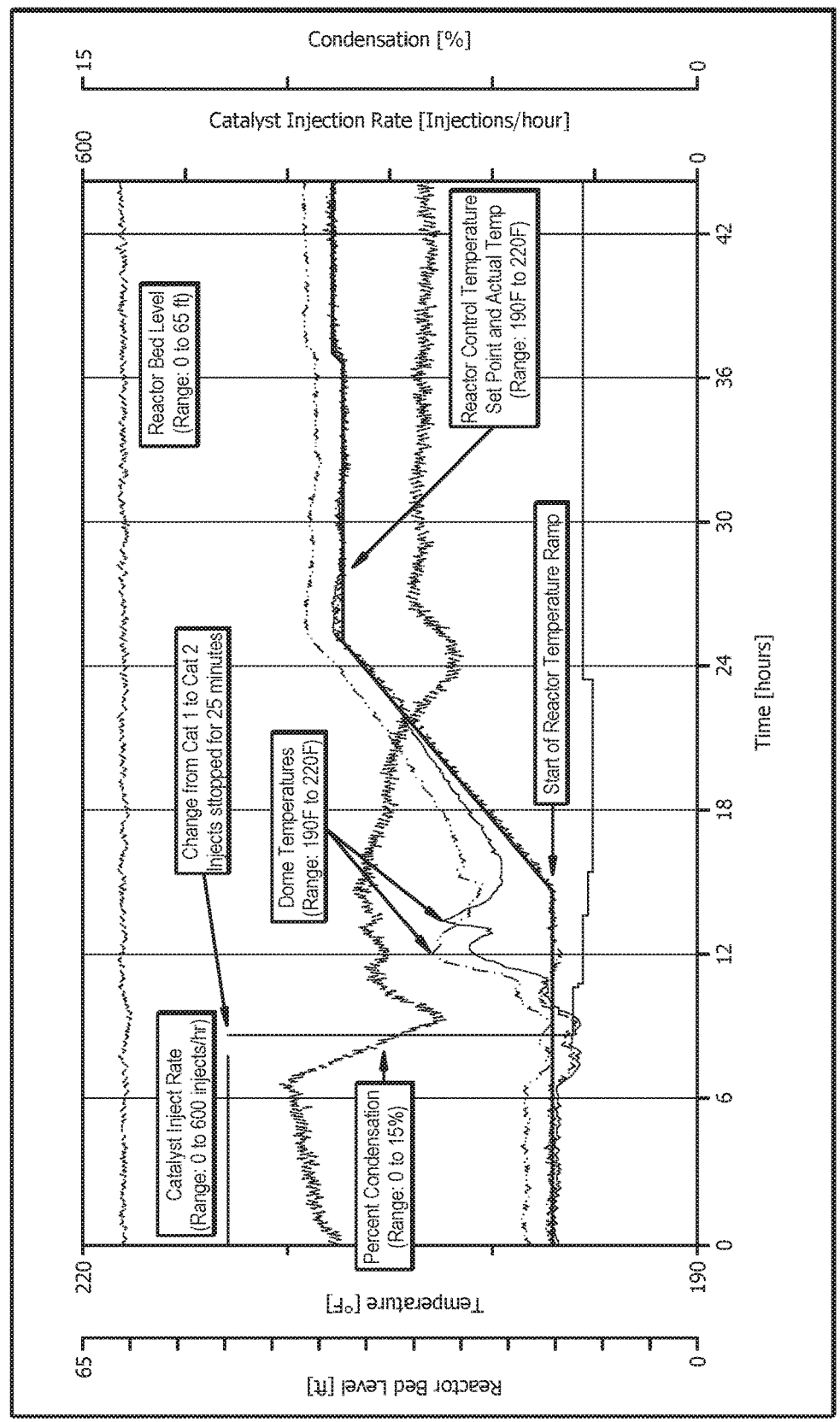
FIG. 5A displays a graph of temperature profiles inside a gas phase reactor operated conventionally for Example 4.
Figure 6A:
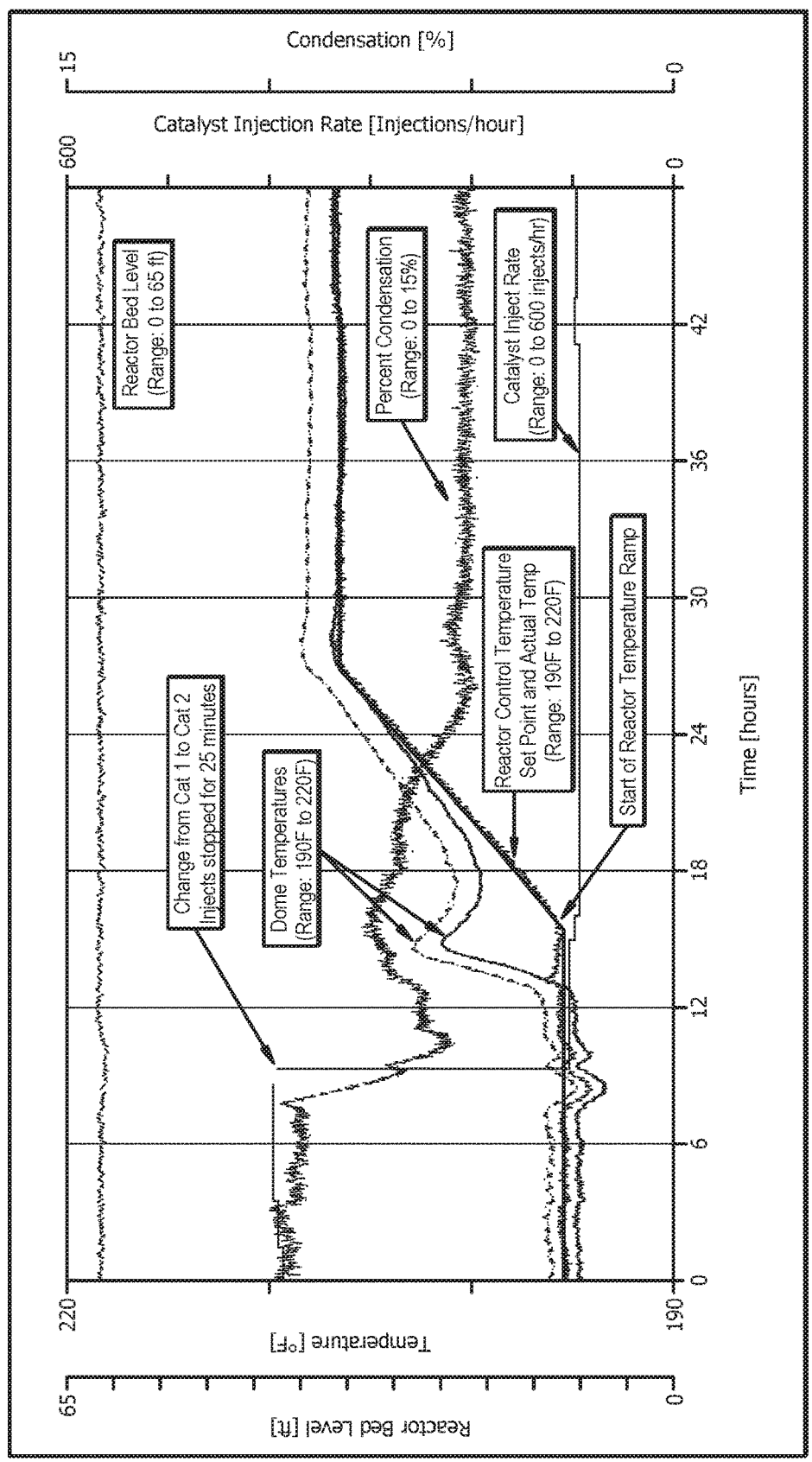
FIG. 6A displays a graph of temperature profiles inside a gas phase reactor operated conventionally for Example 5.

| Example # | 1 | 2 | 3 | 4 | 5 |
|---|---|---|---|---|---|
| Outcome (in terms of polymer agglomerations) | polymer agglomerates present | polymer agglomerates present | polymer agglomerates substantially absent | polymer agglomerates substantially absent | polymer agglomerates substantially absent |
| Percent (by weight) Condensation at Start | 10.6 | 11.1 | 12.3 | 10.1 | 9.3 |
| Percent Condensation at end of Time Period 2 | | | 7.5 | 6.3 | 5.6 |
| Time between Period 1 and Period 2 | 0 | 0 | 20 minutes | 25 minutes | 25 minutes |
| Temperature Ramp | | | | | |
| Start | 11 h 45 min in FIG. 2A | 14 h 15 min in FIG. 3A | 13 h 40 min in FIG. 4A | 14 h 45 min in FIG. 5A | 15 h 55 min in FIG. 6A |
| End | 23 h 15 min in FIG. 2A | 23 h 30 min in FIG. 3A | 24 h 40 min in FIG. 4A | 25 h 15 min in FIG. 5A | 26 h 55 min in FIG. 6A |
| Catalyst Injection Rate [injections/hour] | | | | | |
| Start | 185 | 180 | 130 | 100 | 90 |
| End | 195 | 220 | 135 | 125 | 123 |

Example 1

The performance of a gas phase reactor used for polyethylene production was investigated for a conventional method of transitioning between a first catalyst system (catalyst system 1) comprising silica supported Cr/Al (particle size of about 60 microns) to a second catalyst system (catalyst system 2) comprising silica supported Cr/Ti (particle size of about 100 microns). The experimental conditions are summarized in Table 2 and the resulting data are displayed in FIGS. 2A, 2B, and 2C.

TABLE 2

Figure 2B:
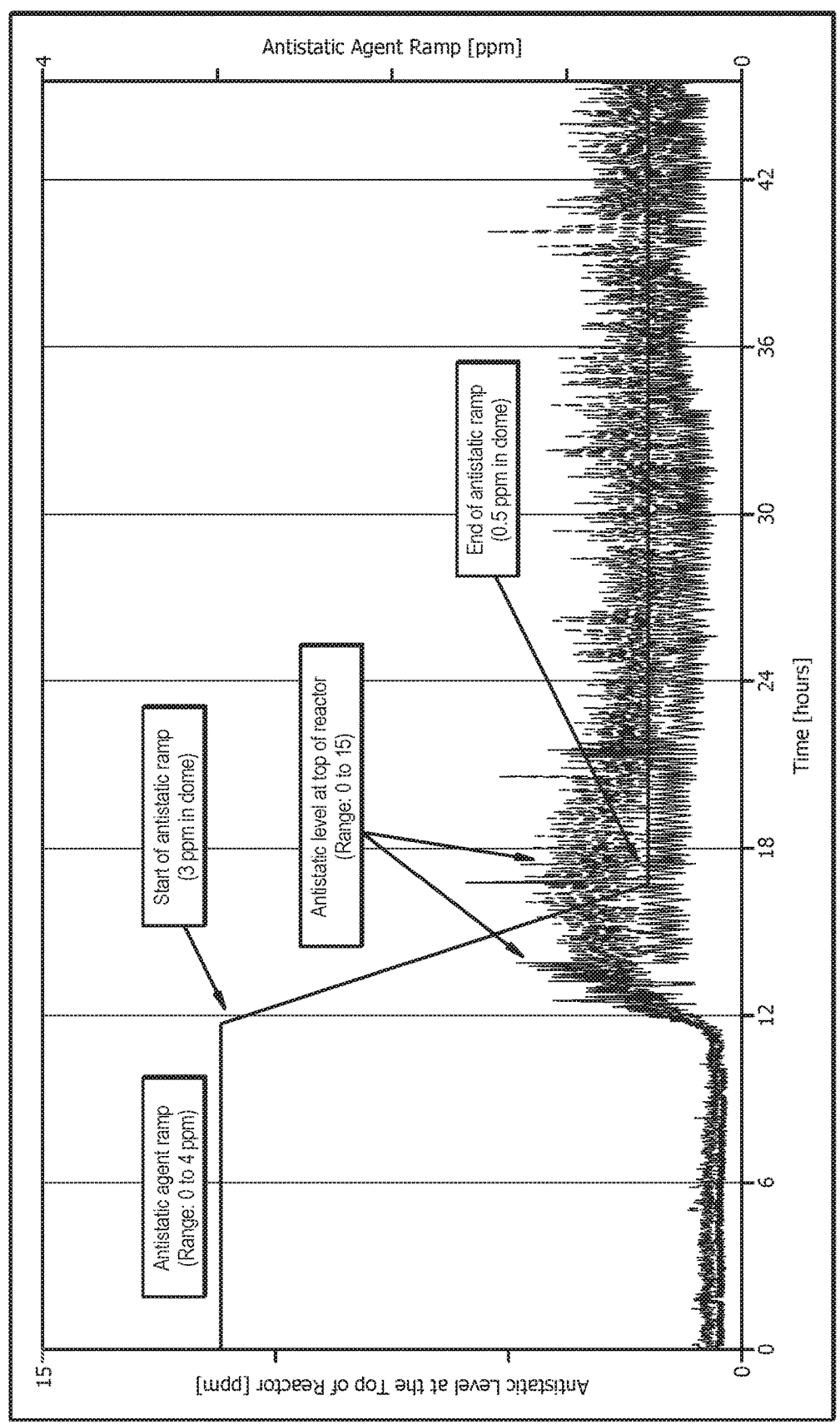
FIG. 2B displays a graph of antistatic agent levels inside a gas phase reactor operated conventionally for Example 1.
Figure 2C:
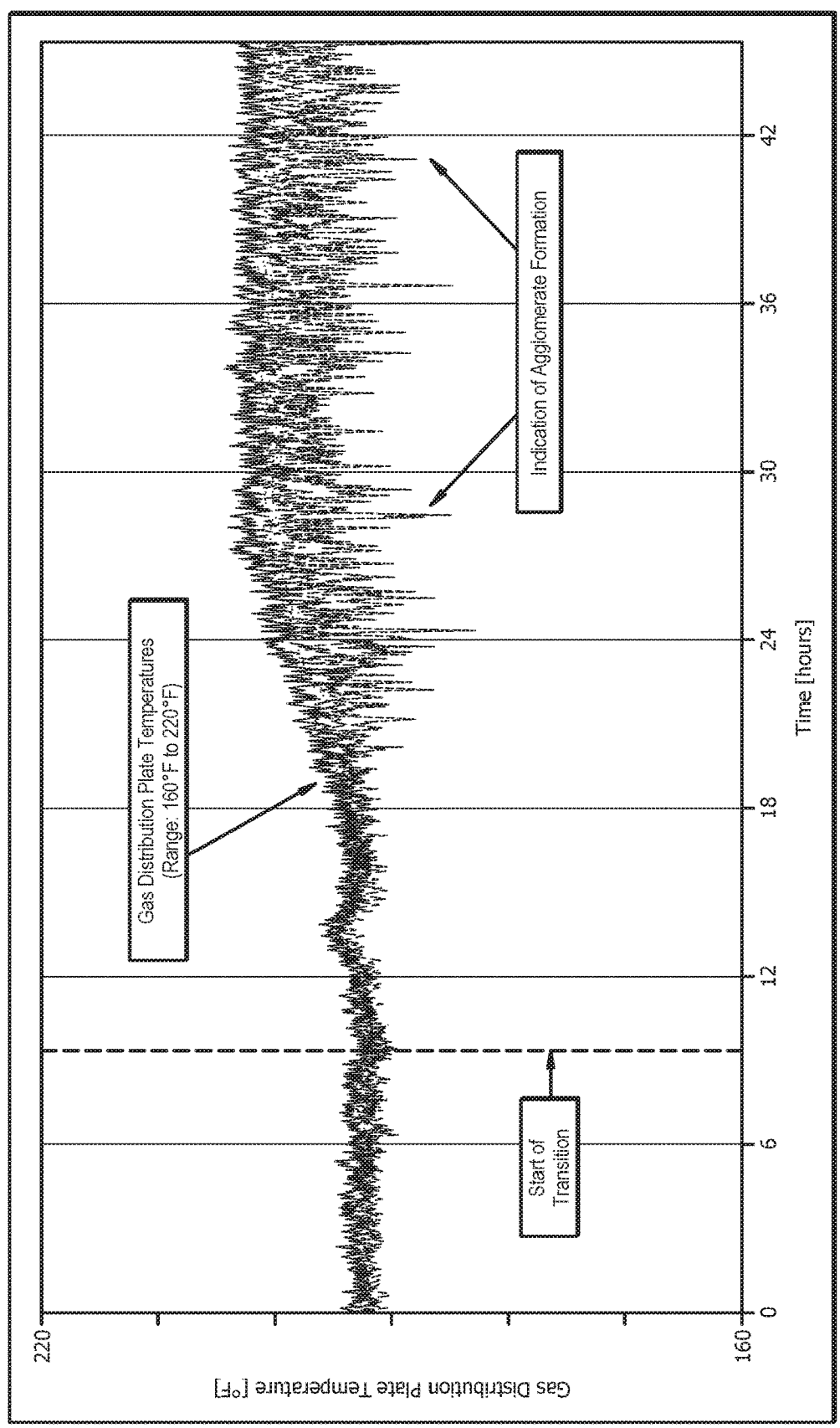
FIG. 2C displays a graph of gas distribution plate temperatures inside a gas phase reactor operated conventionally for Example 1.

| | |
|---|---|
| Transition Description | Agglomerates Produced |
| Transition Catalyst Type | Low chrome to high chrome |
| Catalyst Type | |
| Catalyst 1 | 0.25% chrome |
| Catalyst 2 | 1.0% chrome |
| Ethylene Partial Pressure ($C_2$ PP) | |
| Starting $C_2$ PP | 169 psia |
| Transition Start Time (Start of reduction of $C_2$ PP) | 4 h 40 min in FIGS. 2A-2C |
| Final $C_2$ PP | 108 psia |
| Ethylene Flow Rate ($C_2$ Flow) | |
| Starting $C_2$ Flow (Start of $C_2$ PP reduction) | 61.4 Klbs/hr |
| C2 Flow at stop of Catalyst 1 | 48.4 Klbs/hr |
| C2 Flow at start of Catalyst 2 | 48.4 Klbs/hr |
| Minimum $C_2$ Flow after start of Catalyst 2 | 47.8 Klbs/hr |
| Final $C_2$ Flow (12 hours after temperature ramp complete) | 55.8 Klbs/hr |
| Bed Height | |
| Bed Height at Start | 61.7 ft |
| Minimum Bed Height During Transition | 61.0 ft |
| Final Bed Height | 61.4 ft |

TABLE 2-continued

| Catalyst Injection Rate | |
|---|---|
| Catalyst 1 Injection Rate at Start of Transition | 460 injects per hour |
| Catalyst 1 Stopped | 9 h 40 min in FIG. 2A |
| Catalyst 2 Started | 9 h 40 min in FIG. 2A |
| Time with no catalyst flow | 0 |
| Catalyst 2 Inject rate at Start | 142 injects per hour |
| Catalyst 2 Rate Increased prior to end of temperature ramp | Yes |
| Reactor Temperature | |
| Temperature at Start | 197.5° F. |
| Temperature at End of ramp | 207.0° F. |
| Temperature Ramp Started | 11 h 45 min in FIG. 2A |
| Temperature Ramp Completed | 23 h 15 min in FIG. 2A |
| Temperature ramp delay | 2 Hours |
| Length of Time Temperature Ramp Started after stop of Catalyst 1 | |
| Antistatic (AS) | |
| Antistatic (Dome/Bed) at Start | 3 ppm/7 ppm |
| Antistatic (Dome/Bed) at Final | 0.5 ppm/9.5 ppm |
| Time for AS decrease in Dome | 11 h 40 min in FIG. 2B |
| Time AS Ramp Complete | 16 h 40 min in FIG. 2B |
| Time after catalyst switch | 2 Hours |
| Length of ramp | 5 Hours |
| Condensation (Cond) Level (percent by weight) | |
| Percent Cond at Start | 10.6 |
| Percent Cond at Stop of Catalyst 1 | 8.2 |
| Percent Cond minimum after start of Catalyst 2 | 6.7 |
| Dome Temperature | |
| Maximum Dome Temperature | 207.1° F. |

Catalyst 2 was started to be introduced into the reactor immediately upon the cessation of addition of catalyst 1 at 9 hours 40 minutes in FIGS. 2A-2C. Coincidentally with the introduction of catalyst 2, the ethylene partial pressure was started to be reduced from 169 psia to 108 psia. Two hours subsequently, the temperature increase was started. The temperature set point was linearly increased by 9.5° F. over the course of 11.5 hours. Coincidentally to the time of the start of the temperature ramp, the antistatic (AS) agent addition was changed over the next five hours.

During this transition, the percent condensation (measured via a flowmeter in the liquid condensate recycle piping) decreased from 10.6 wt. % to a minimum of 6.7 wt. %. The fluidized bed height was held constant at 61.5 feet. The reactor was not idled during the transition and production continued continuously.

About 2 hours after the introduction of catalyst 2, there was an increase in the reactor temperature to as much as 2° F. above the temperature set point—see FIG. 2A. At about this same time (about 12 h and subsequently in FIG. 2A) there were large increases in the static voltages measured in the reactor recycle line—see FIG. 2B. During this transition, agglomerates started to form at the very top of the reactor (as indicated by internal dome temperatures excursions above reactor temperature—see FIG. 2A). The maximum dome temperature of 207.1° F. occurred at about 15 h in FIG. 2A. Between four and six hours after the start of the transition (about 13 h to 15 h in FIG. 2A), the dome temperatures spiked to as much as 8° F. greater than the reactor temperature—see FIG. 2A. These agglomerates then fell off the top of the dome onto the gas distributor tray starting about 16 h in FIGS. 2A-2C. The presence of these agglomerates on the gas distributor tray (gas distribution plate) in the reactor can be inferred via the gas distributor thermocouple responses as shown in FIG. 2C. At about 22 h in FIG. 2A, the rate of addition of catalyst 2 started to be increased, prior to the completion of the increase in reactor temperature set point. Agglomerates were found in the product from the reactor during the next 15 days. The presence of these agglomerates necessitated a reduction in the production rate of the reactor by about 10 percent. These data indicate that although the continuous transition from catalyst system 1 to catalyst system 2 was possible, the transition procedure caused agglomerates to be formed in the reactor. These agglomerates then adversely affected reactor performance afterwards.

Example 2

The performance of a gas phase reactor used for polyethylene production was investigated for a conventional method of transitioning between a first catalyst system (catalyst system 1) comprising silica supported Cr/Al (particle size of about 60 microns) to a second catalyst system (catalyst system 2) comprising silica supported Cr/Ti (particle size of about 100 microns). The experimental conditions are summarized in Table 3 and the resulting data are displayed in FIGS. 3A, 3B, and 3C. The catalyst injection rate of catalyst 1 prior to the transition, and the polymer production rate were higher in Example 2 than in Example 1.

TABLE 3

Figure 3B:
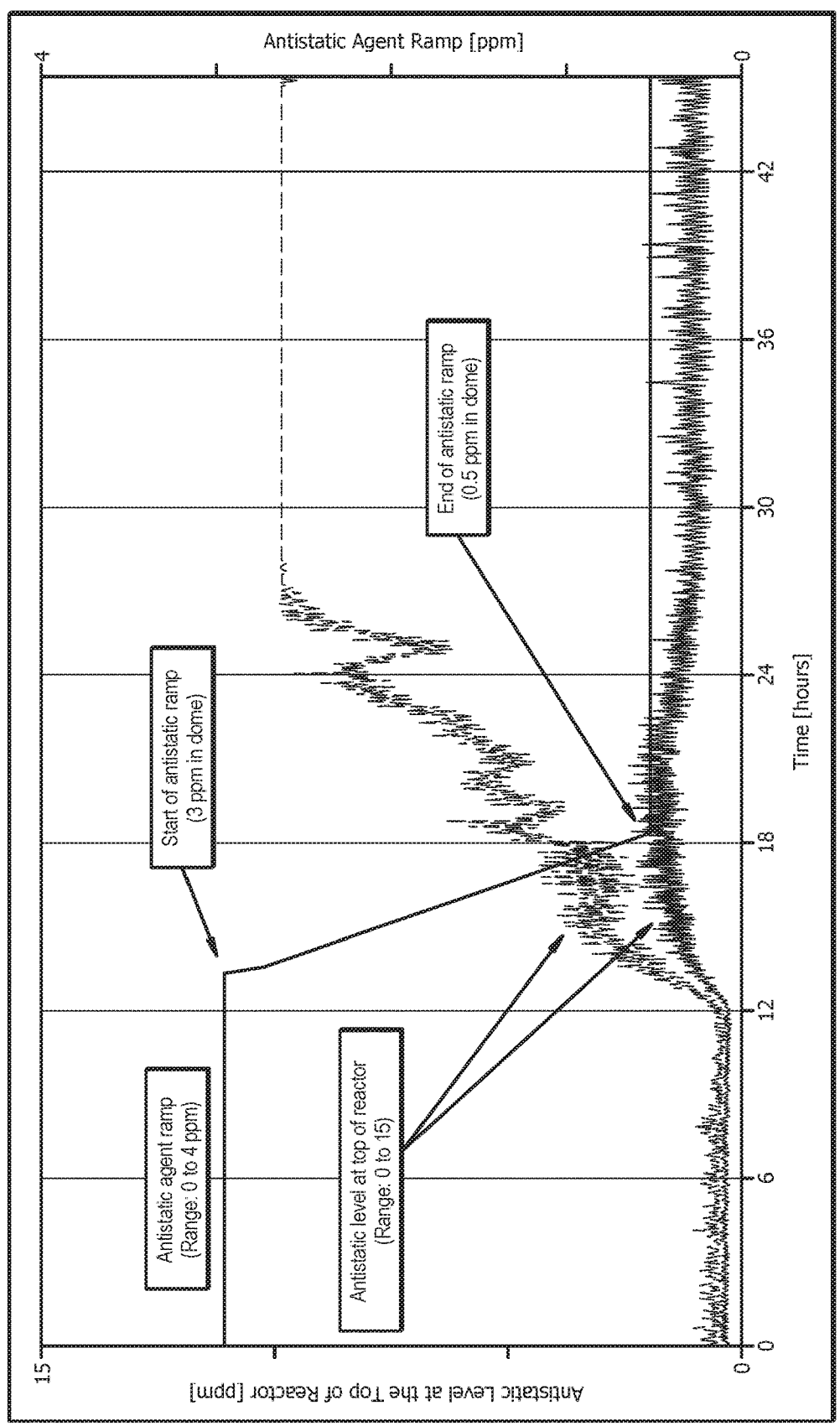
FIG. 3B displays a graph of antistatic agent levels inside a gas phase reactor operated conventionally for Example 2.
Figure 3C:
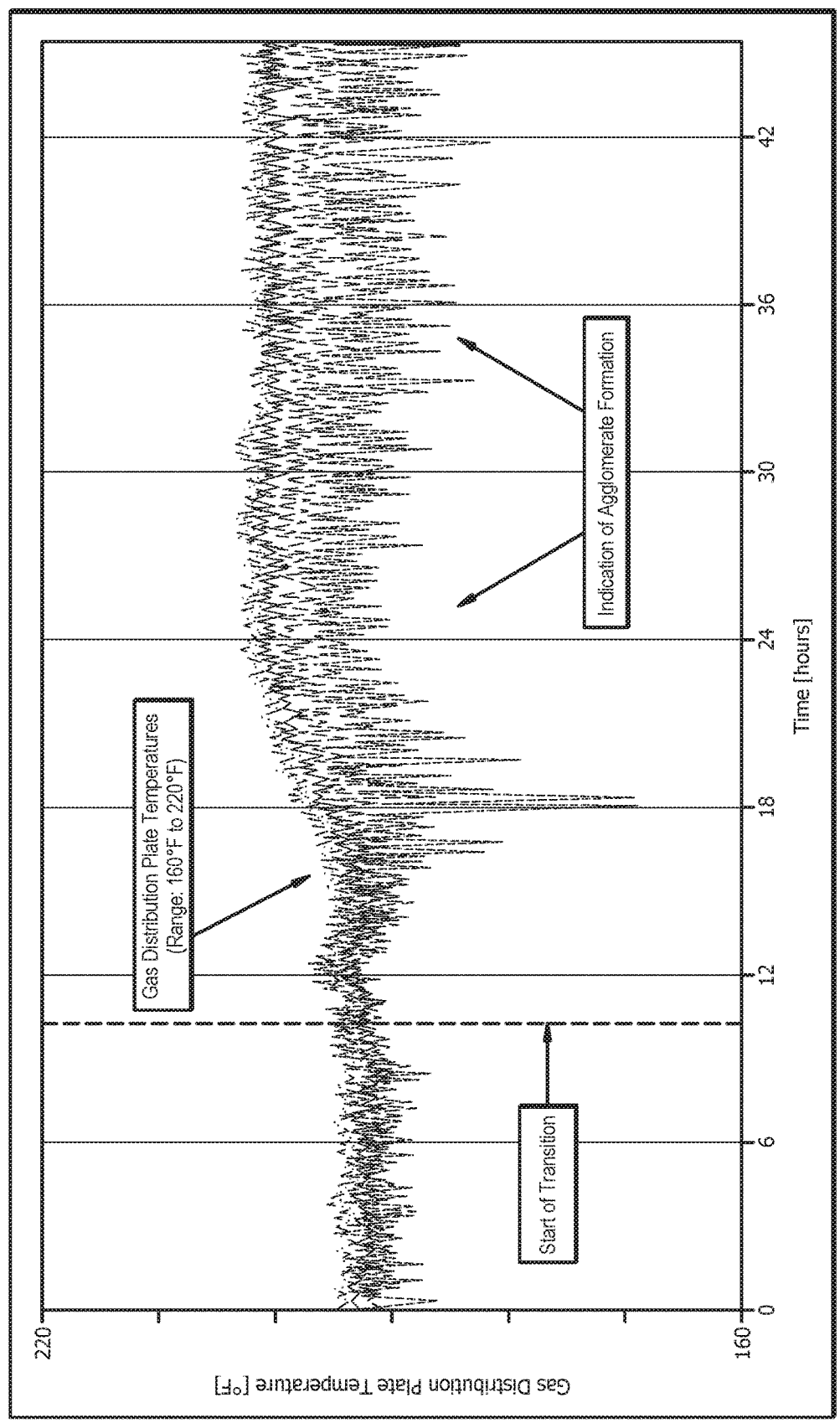
FIG. 3C displays a graph of gas distribution plate temperatures inside a gas phase reactor operated conventionally for Example 2.

| Transition Description | Agglomerates Produced |
|---|---|
| Transition Catalyst Type | Low chrome to high chrome |
| Catalyst Type | |
| Catalyst 1 | 0.25% chrome |
| Catalyst 2 | 1.0% chrome |
| Ethylene Partial Pressure (C$_2$ PP) | |
| Starting C$_2$ PP | 166 psia |
| Transition Start Time (Start of reduction in C$_2$ PP) | 7 h 45 min in FIGS. 3A-3C |
| Final C2 PP | 106 psia |
| Ethylene Flow Rate (C$_2$ Flow) | |
| Starting C$_2$ Flow (Start of C$_2$ PP reduction) | 57.3 klbs/hr |
| C$_2$ Flow at stop of Catalyst 1 | 40.9 klbs/hr |
| C$_2$ Flow at start of Catalyst 2 | 40.9 klbs/hr |
| Minimum C$_2$ Flow after start of Catalyst 2 | 39.0 klbs/hr |
| Final C$_2$ Flow (12 hours after temperature ramp complete) | 59.4 klbs/hr |
| Bed Height | |
| Bed Height at Start | 61.9 ft |
| Minimum Bed Height During Transition | 61.2 ft |
| Final Bed Height | 62.0 ft |
| Catalyst Injection Rate | |
| Catalyst 1 Injection Rate at Start of Transition | 530 injects/hr |
| Catalyst 1 Stopped | 10 h 10 min in FIG. 3A |
| Catalyst 2 Started | 10 h 10 min in FIG. 3A |
| Time with no catalyst flow | 0 |
| Catalyst 2 Inject rate at Start | 130 injects per hour |
| Catalyst 2 Rate Increased prior to end of temperature ramp | No |

TABLE 3-continued

| Reactor Temperature | |
|---|---|
| Temperature at Start | 197° F. |
| Temperature at End of ramp | 206° F. |
| Temperature Ramp Started | 14 h 15 min in FIG. 3A |
| Temperature Ramp Completed | 23 h 30 mi in FIG. 3A |
| Temperature ramp delay Length of Time Temperature Ramp Started after stop of Catalyst 1 Antistatic Agent (AA) | 3 Hours |
| Antistatic (Dome/Bed) at Start | 3 ppm/7 ppm |
| Antistatic (Dome/Bed) at Final | 0.5 ppm/9.5 ppm |
| Time for AA decrease in Dome | 13 h 15 min in FIG. 3B |
| Time AA Ramp Complete | 18 h 15 min in FIG. 3B |
| Time after catalyst switch | 2 Hours |
| Length of ramp Condensation (Cond) Level | 5 Hours |
| Percent Cond at Start | 11.1 |
| Percent Cond at Stop of Catalyst 1 | 5.8 |
| Percent Cond minimum after start of Catalyst 2 Dome Temperature | 5.7 |
| Maximum Dome Temperature | 208.6° F. |

In an attempt to limit the amount of carryover static subsequent to the introduction of catalyst 2, the starting time for the anti-stat ramp was postponed by 2 hours from 12 h to 14 h so that there was more antistatic injection to the dome during the period of high carryover static—see FIG. 3B. This change was beneficial in reducing the amount of static.

Also, in an attempt to improve temperature control during the transition, the start of the temperature ramp increase was postponed by almost 3 hours when compared to Example 1 (14 h 15 min in FIG. 3A as compared to 11 h 45 min in FIG. 2A). This postponement mitigated, but did not eliminate the deviation in reactor temperature above set point between about 12 h and 14 h.

The increase in feed rate of catalyst 2 was not started until after the temperature set point ramp was complete at about 26 h in FIG. 3A. This postponement was an attempt to minimize agglomerates formation.

During this transition, a large amount of agglomerates were formed—see FIG. 3C. The maximum deviation of dome temperatures above reactor bed temperature was 11.6° F. and that occurred at about 15 h in FIG. 3A. The increased feed rate of catalyst 1 prior to the transition did not help minimize the reduction in percent liquid condensate flow during the transition. It was concluded that instead of helping the transition, the increase in catalyst 1 feed rate prior to the transition was detrimental to the success of the transition because there was a longer period of time in which a higher concentration of both active catalysts 1 and 2 were present in the reactor simultaneously. The beneficial effects of the changes in temperature ramp, or antistat ramp, or rate of addition of catalyst 2 were negated by the increased addition rate of catalyst 1 prior to the transition.

As it can be seen from Examples 1 and 2, by using the conventional method of transitioning from the first catalyst system to the second catalyst system, there is a great deal of noise in the temperature profiles associated with the transition from the first catalyst system to the second catalyst system, due to the formation of polymer (polyethylene copolymer) agglomerates.

Example 3

The performance of a gas phase reactor used for polyethylene production was investigated according to the methods disclosed herein for transitioning between a first catalyst system (catalyst system 1) comprising silica supported Cr/Al (particle size of about 60 microns) to a second catalyst system (catalyst system 2) comprising silica supported Cr/Ti (particle size of about 100 microns). The experimental conditions are summarized in Table 4 and the resulting data are displayed in FIGS. 4A, 4B, and 4C.

TABLE 4

Figure 4B:
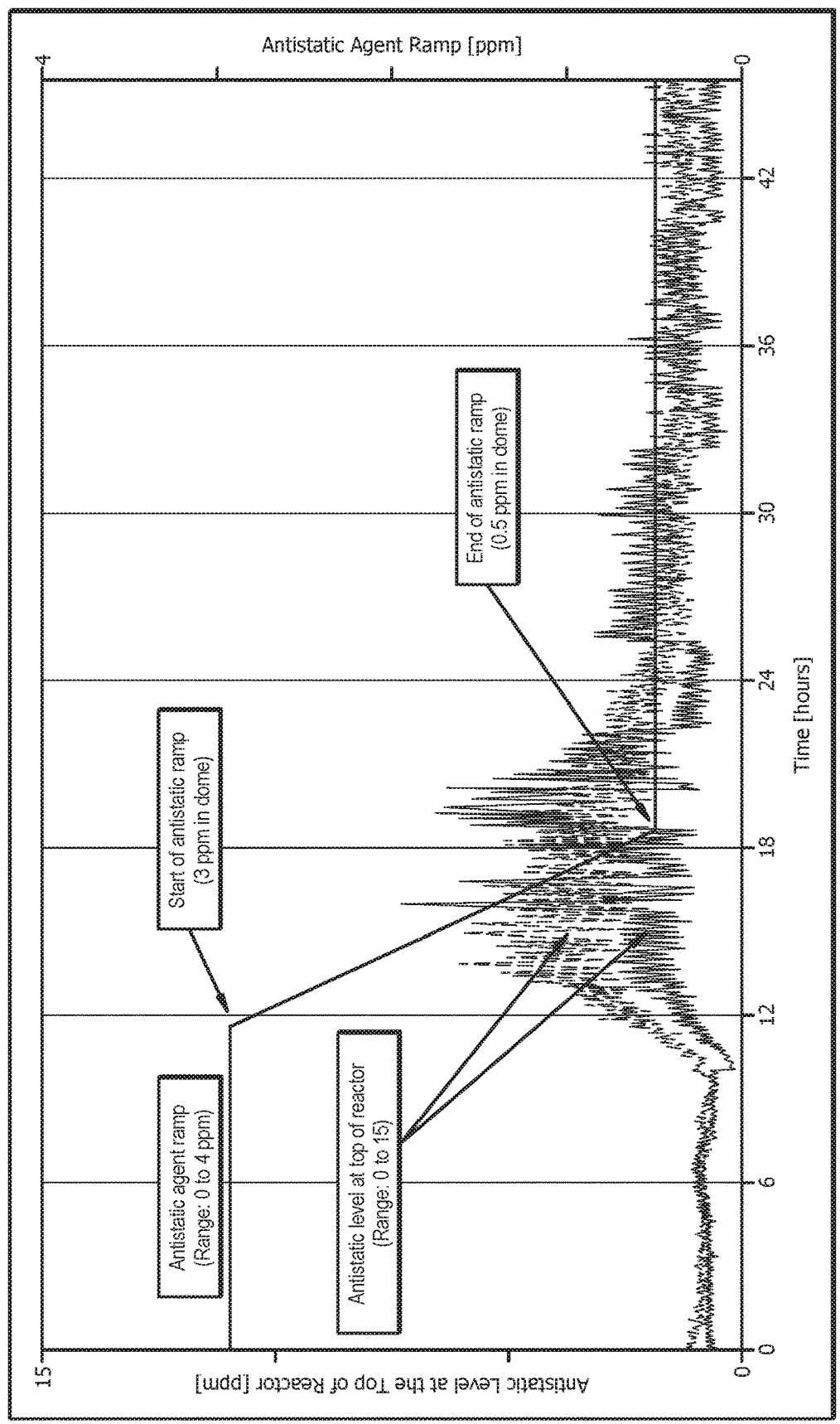
FIG. 4B displays a graph of antistatic agent levels inside a gas phase reactor operated conventionally for Example 3.
Figure 4C:
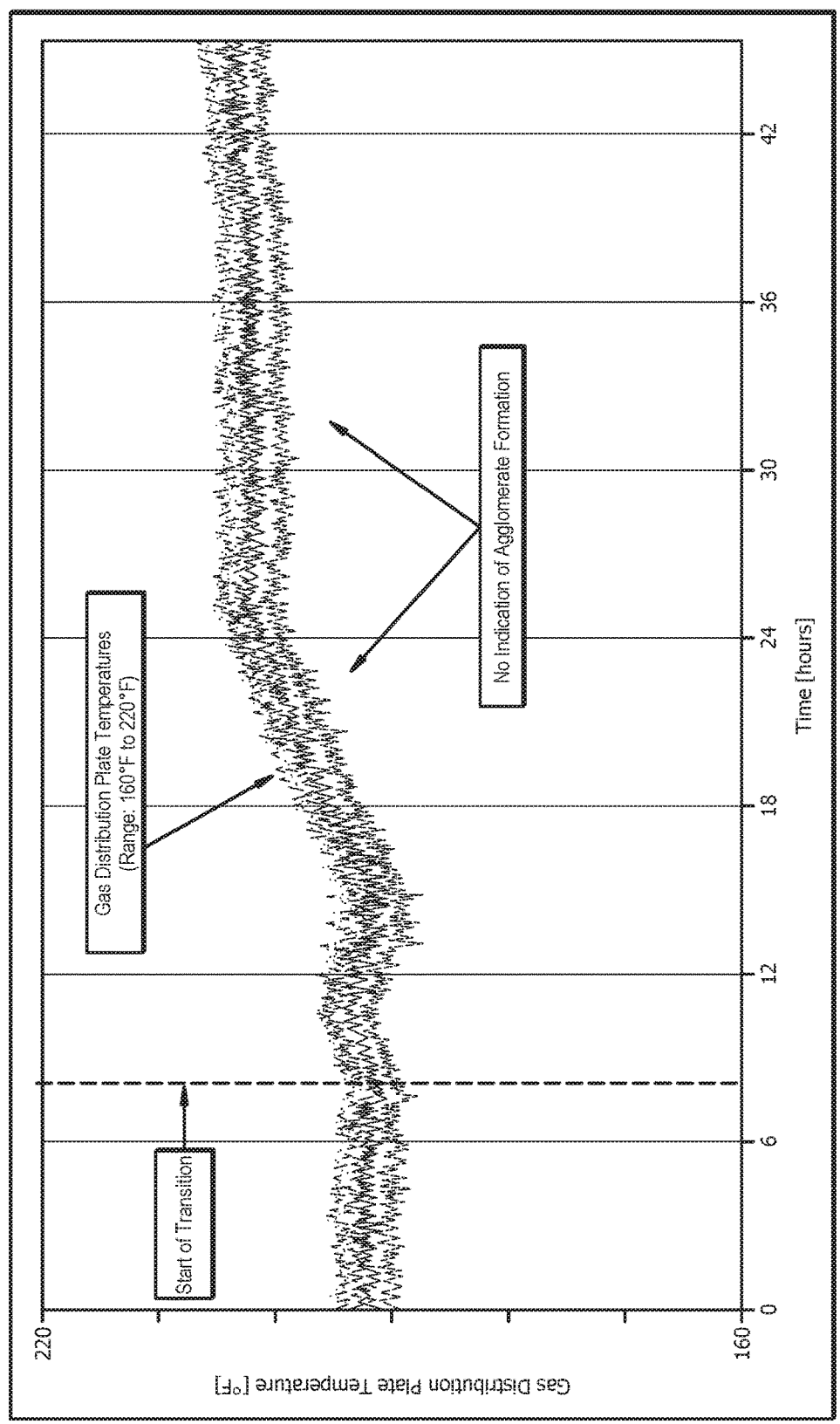
FIG. 4C displays a graph of gas distribution plate temperatures inside a gas phase reactor operated conventionally for Example 3.

| Transition Description | No agglomerates |
|---|---|
| Transition Catalyst Type | Low chrome to high chrome |
| Catalyst Type | |
| Catalyst 1 | 0.25% chrome |
| Catalyst 2 | 1.0% chrome |
| Ethylene Partial Pressure ($C_2$ PP) | |
| Starting $C_2$ PP | 160 psia |
| Transition Start Time (Start of $C_2$ PP reduction) | 7 h in FIGS. 4A-4C |
| Final $C_2$ PP | 100 psia |
| Ethylene Flow Rate ($C_2$ Flow) | |
| Starting $C_2$ Flow (Start of $C_2$ PP reduction) | 57.5 Klbs/hr |
| $C_2$ Flow at stop of Catalyst 1 | 41.0 Klbs/hr |
| $C_2$ Flow at start of Catalyst 2 | 41.0 Klbs/hr |
| Minimum $C_2$ Flow after start of Catalyst 2 | 37.5 Klbs/hr |
| Final $C_2$ Flow (12 hours after temperature ramp complete) Bed Height | 50.1 Klbs/hr |
| Bed Height at Start | 62.0 ft |
| Minimum Bed Height During Transition | 61.0 ft |
| Final Bed Height Catalyst Injection Rate | 61.7 ft |
| Catalyst 1 Injection Rate at Start of Transition | 460 injects per hour |
| Catalyst 1 Stopped | 8 h 20 min in FIG. 4A |
| Catalyst 2 Started | 8 h 40 min in FIG. 4A |
| Time with no catalyst flow | 20 minutes |
| Catalyst 2 Inject rate at Start | 130 injects per hour |
| Catalyst 2 Rate Increased prior to end of temperature ramp Reactor Temperature | No |
| Temperature at Start | 196.5° F. |
| Temperature at End of ramp | 207.0° F. |
| Temperature Ramp Started | 13 h 40 min in FIG. 4A |
| Temperature Ramp Completed | 24 h 40 min in FIG. 4A |
| Temperature ramp delay Length of Time Temperature Ramp Started after stop of Catalyst 1 Antistatic Agent (AA) | 5 Hours |
| Antistatic (Dome/Bed) at Start | 3 ppm/7 ppm |
| Antistatic (Dome/Bed) at Final | 0.5 ppm/9.5 ppm |
| Time for AA decrease in Dome | 11 h 40 min in FIG. 4B |
| Time AA Ramp Complete | 18 h 40 min in FIG. 4B |
| Time after catalyst switch | 3 Hours |
| Length of ramp Condensation (Cond) Level | 7 Hours |
| Percent Cond at Start | 12.3 |
| Percent Cond at Stop of Catalyst 1 | 8.7 |

TABLE 4-continued

| | |
|---|---|
| Percent Cond minimum after start of Catalyst 2 | 7.5 |
| Dome Temperature | |
| Maximum Dome Temperature | 206.7° F. |

No catalyst system (neither 1 nor 2) was fed to the reactor for a duration of 20 minutes at the onset of the transition when the ethylene partial pressure reduction was started. Very few agglomerates were formed during this run—see FIG. 4C. In comparison to Example 2, this transition maintained the same antistat and temperature transition protocols; however, the time and concentration of simultaneous presences of active catalyst 1 and 2 were reduced. This reduction vs. Example 2 was made by returning to the lower catalyst 1 feed rate prior to the transition of Example 1 and then also by not introducing any catalyst system (neither 1 nor 2) for 20 minutes—from 8 h 20 min until 8 h 40 min in FIGS. 4A-4C.

Although there was no catalyst feed to the reactor for 20 minutes, the minimum percent condensing was never below 7.5%—see FIG. 4A. It was concluded from this example that separation in time of catalysts 1 and 2 could be accomplished while maintaining a sufficient minimum liquid condensing flow.

It was also concluded that this separation of catalysts 1 and 2 was beneficial in reducing dome temperature excursions and resulting agglomerates formation. During this transition, the maximum deviation of above reactor temperature in the dome was 10.2° F.—see FIG. 4A. However, these maximum temperatures occurred earlier in the transition (at about 13 h in FIG. 4A), and by 15 h, one of the dome temperatures had dropped down to match the reactor bed set point temperature. It is likely that some agglomerates were formed at the height of this dome temperature excursion; however, the amount of agglomerate formation was greatly attenuated as compared to Examples 1 and 2.

In comparison to Example 1, increase in the rate of catalyst 2 did not start until 42 h in FIG. 4A. The maximum deviation in reactor temperature above set point was only 1° F. at 36 h in FIG. 4A. Subsequently, for the duration of the transition, the temperature tracked the set point within 1° F.

It was concluded from these data that the reactor could indeed be transitioned continuously from using catalyst system 1 to using catalyst system 2 while producing minimal agglomerates. The reduction in overlap of the amounts of active catalyst systems 1 and 2 was instrumental in achieving this goal. It was possible to maintain sufficient condensing for good reactor operation while attaining the reduction in overlap of active catalyst systems.

Example 4

The performance of a gas phase reactor used for polyethylene production was investigated according to the methods disclosed herein for transitioning between a first catalyst system (catalyst system 1) comprising silica supported Cr/Al (particle size of about 60 microns) to a second catalyst system (catalyst system 2) comprising silica supported Cr/Ti (particle size of about 100 microns). The experimental conditions are summarized in Table 5 and the resulting data are displayed in FIGS. 5A, 5B, and 5C.

TABLE 5

Figure 5B:
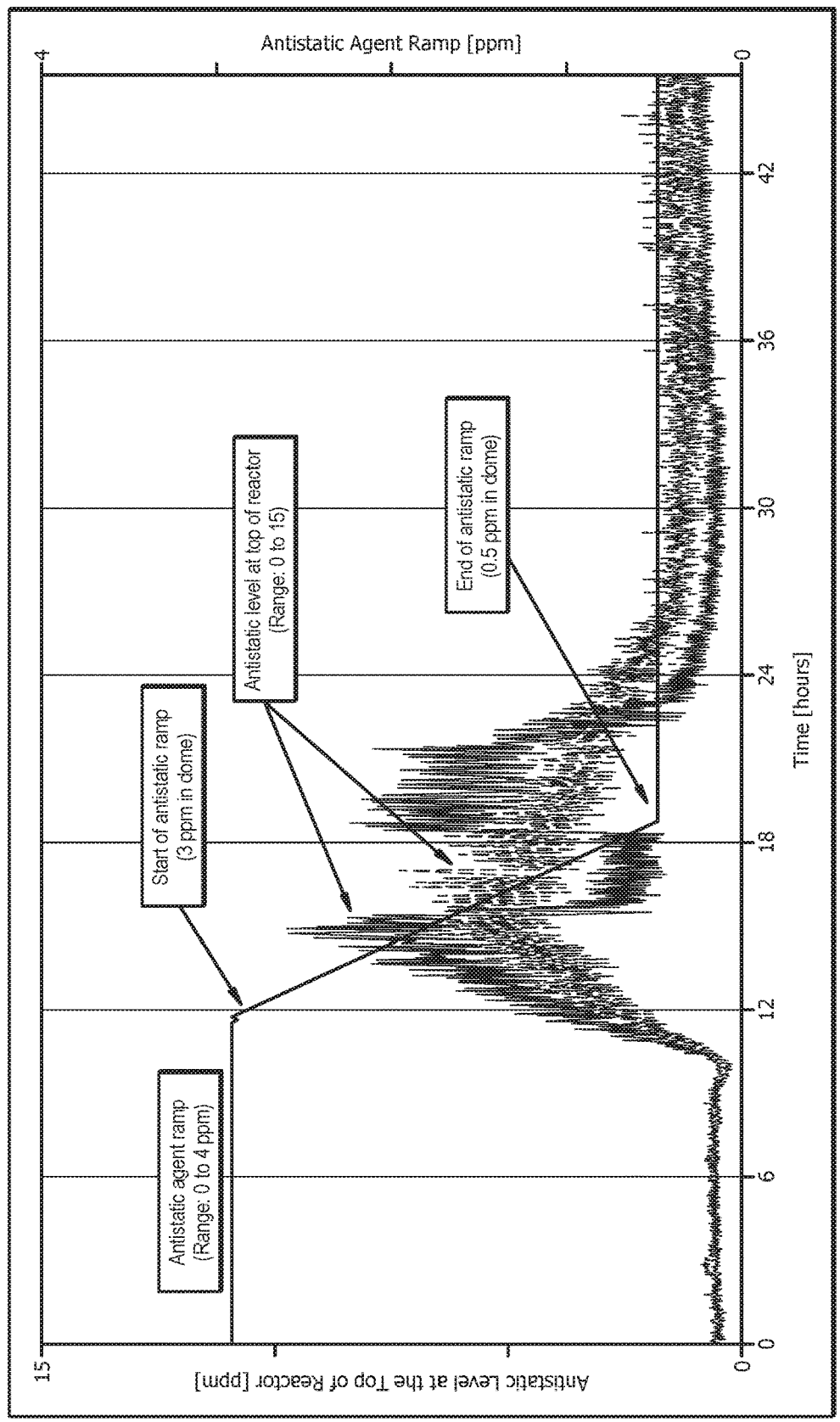
FIG. 5B displays a graph of antistatic agent levels inside a gas phase reactor operated conventionally for Example 4.
Figure 5C:
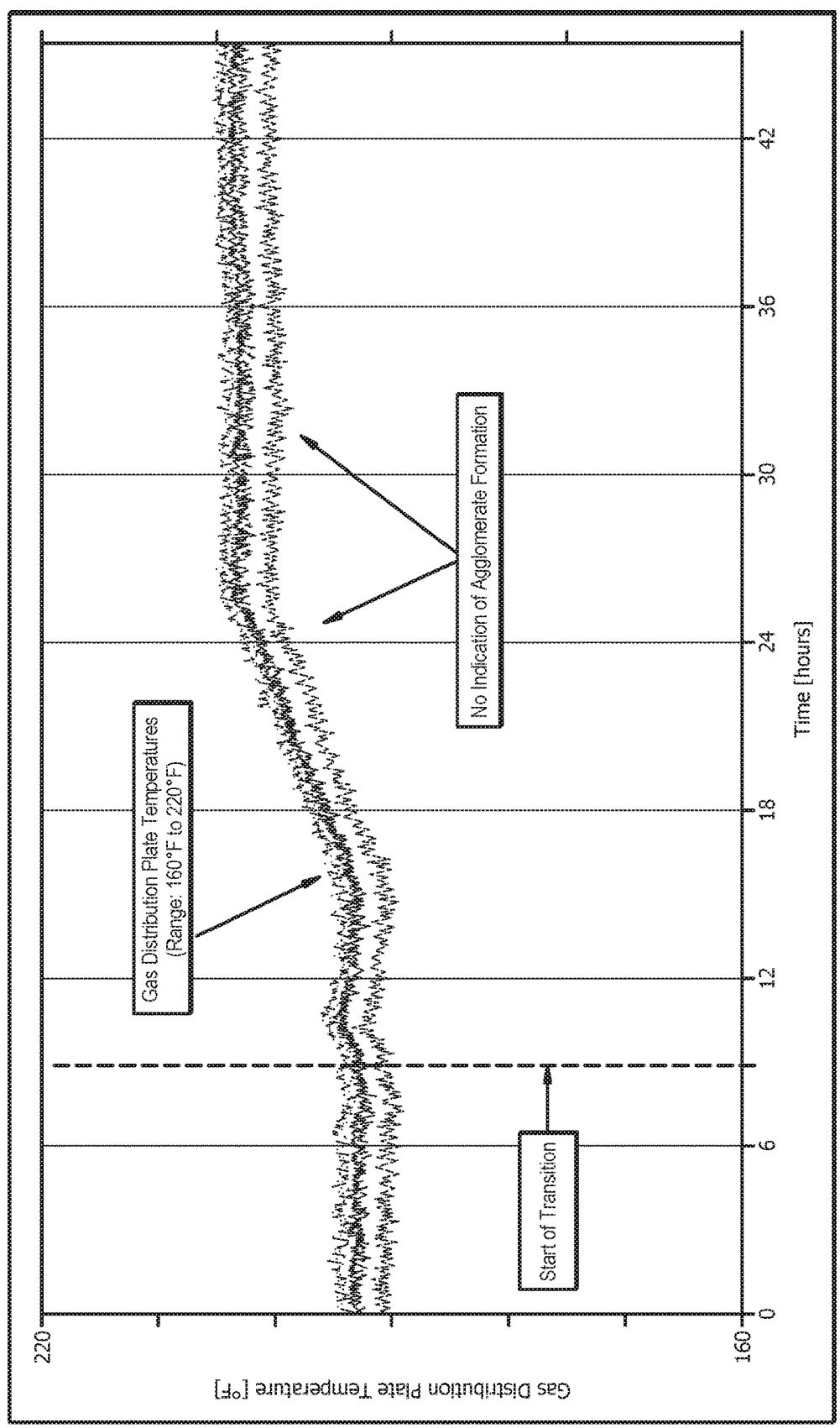
FIG. 5C displays a graph of gas distribution plate temperatures inside a gas phase reactor operated conventionally for Example 4.

| | |
|---|---|
| Transition Description | No agglomerates |
| Transition Catalyst Type | Low chrome to high chrome |
| Catalyst Type | |
| Catalyst 1 | 0.25% chrome |
| Catalyst 2 | 1.0% chrome |
| Ethylene Partial Pressure ($C_2$ PP) | |
| Starting $C_2$ PP | 158 psia |
| Transition Start Time (Start of $C_2$ PP reduction) | 6 h 30 min in FIGS. 5A-5C |
| Final $C_2$ PP | 94 psia |
| Ethylene Flow Rate ($C_2$ Flow) | |
| Starting $C_2$ Flow (Start of $C_2$ PP reduction) | 52.5 Klbs/hr |
| $C_2$ Flow at stop of Catalyst 1 | 40.8 Klbs/hr |
| $C_2$ Flow at start of Catalyst 2 | 39.7 Klbs/hr |
| Minimum $C_2$ Flow after start of Catalyst 2 | 37.5 Klbs/hr |
| Final $C_2$ Flow (12 hours after temperature ramp complete) | 41.2 Klbs/hr |
| Bed Height | |
| Bed Height at Start | 61.2 ft |
| Minimum Bed Height During Transition | 60.8 ft |
| Final Bed Height | 61.8 ft |
| Catalyst Injection Rate | |
| Catalyst 1 Injection Rate at Start of Transition | 460 injects per hour |
| Catalyst 1 Stopped | 8 h 20 min in FIG. 5A |
| Catalyst 2 Started | 8 h 45 min in FIG. 5A |
| Time with no catalyst flow | 25 minutes |
| Catalyst 2 Inject rate at Start | 130 injects per hour |
| Catalyst 2 Rate Increased prior to end of temperature ramp | No |
| Reactor Temperature | |
| Temperature at Start | 197° F. |
| Temperature at End of ramp | 207.5° F. |
| Temperature Ramp Started | 14 h 45 min in FIG. 5A |
| Temperature Ramp Completed | 25 h 15 min in FIG. 5A |
| Temperature ramp delay Length of Time Temperature Ramp Started after stop of Catalyst 1 | 6 Hours |
| Antistatic Agent (AA) | |
| Antistatic (Dome/Bed) at Start | 3 ppm/7 ppm |
| Antistatic (Dome/Bed) at Final | 0.5 ppm/9.5 ppm |
| Time for AA decrease in Dome | 12 h in FIG. 5B |
| Time AA Ramp Complete | 19 h in FIG. 5B |
| Time after catalyst switch | 3.5 Hours |
| Length of ramp | 7 Hours |
| Condensation (Cond) Level | |
| Percent Cond at Start | 10.1 |
| Percent Cond at Stop of Catalyst 1 | 7.1 |
| Percent Cond minimum after start of Catalyst 2 | 6.3 |
| Dome Temperature | |
| Maximum Dome Temperature | 202.9° F. |

In this example, the feed rate of catalyst system 2 was not increased during the duration of the temperature ramp as in Example 3. The time period of no catalyst addition was increased by 5 minutes to 25 minutes and the time delay before starting the temperature ramp was increased by 1 hour to 6 hours. The minimum flow rate of condensate did decrease slightly by about 1%; nonetheless, the maximum increase in dome temperature was only 5.9° F. above reactor bed set point temperature and the reactor did not produce agglomerates.

These data showed that catalyst feed rate of catalyst 2 could be reduced even further while still maintaining a sufficient minimum percent condensing so that the condensate pump did not shut down.

These data further established that a continuous transition from catalyst system 1 to catalyst system 2 is possible without having to shutdown the reactor between catalyst additions. The bed height was maintained constant throughout the transition—see FIG. 5A. Furthermore, these data established that the transition can be made without producing any agglomerates—see FIG. 5C.

Example 5

The performance of a gas phase reactor used for polyethylene production was investigated according to the methods disclosed herein for transitioning between a first catalyst system (catalyst system 1) comprising silica supported Cr/Al (particle size of about 60 microns) to a second catalyst system (catalyst system 2) comprising silica supported Cr/Ti (particle size of about 100 microns). The experimental conditions are summarized in Table 6 and the resulting data are displayed in FIGS. 6A, 6B, and 6C.

TABLE 6

Figure 6B:
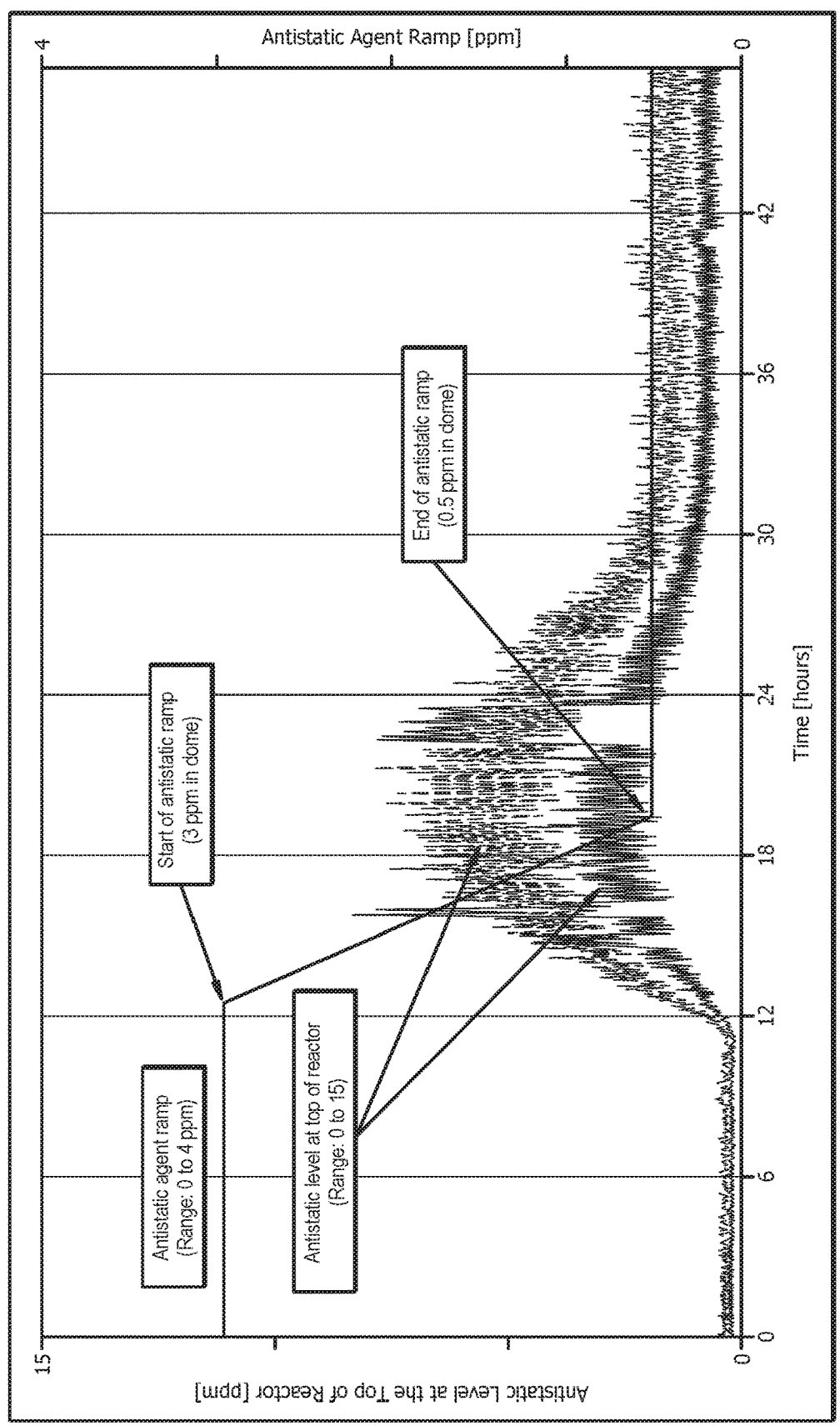
FIG. 6B displays a graph of antistatic agent levels inside a gas phase reactor operated conventionally for Example 5.
Figure 6C:
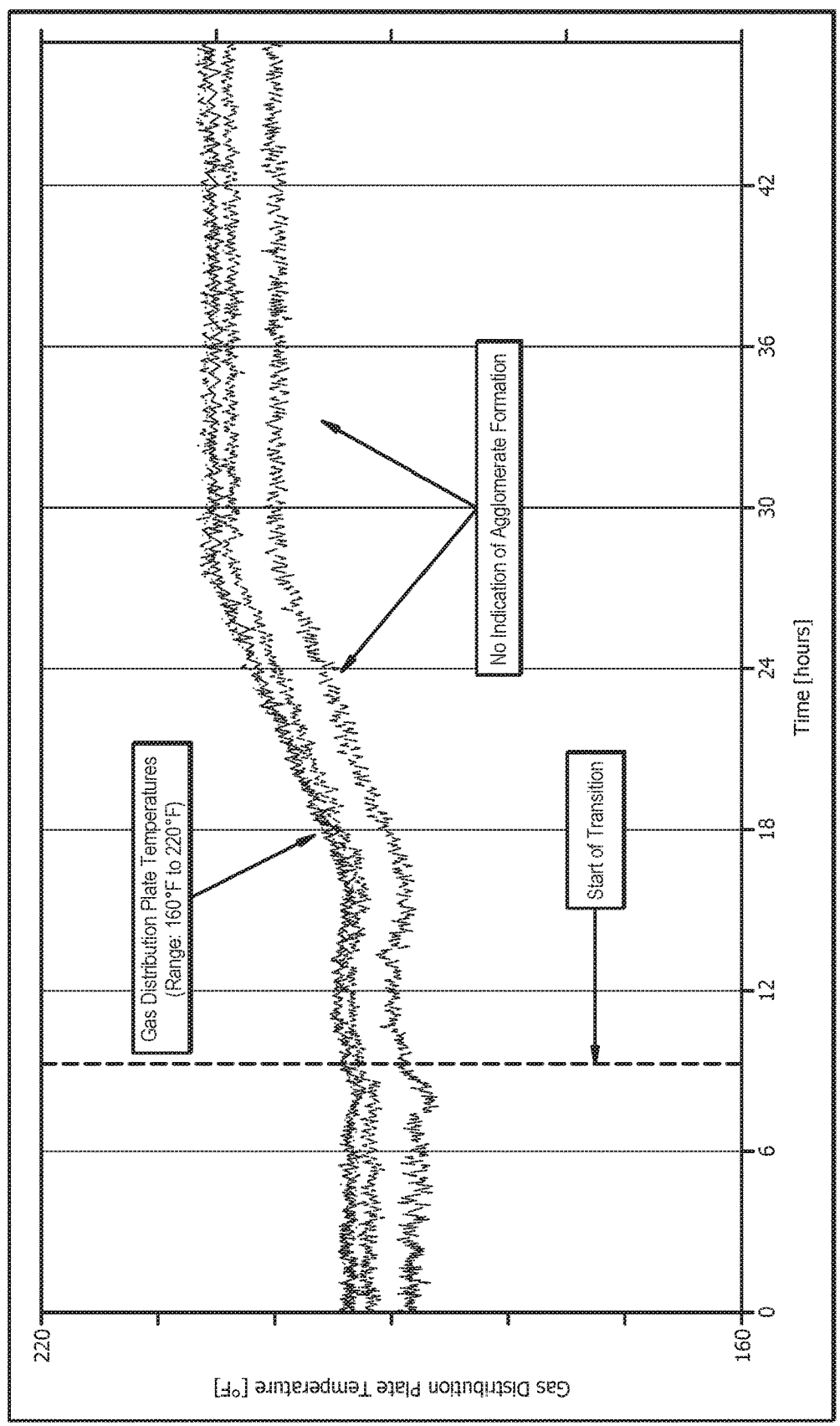
FIG. 6C displays a graph of gas distribution plate temperatures inside a gas phase reactor operated conventionally for Example 5.

| | |
|---|---|
| Transition Description | No agglomerates |
| Transition Catalyst Type | Low chrome to high chrome |
| Catalyst Type | |
| Catalyst 1 | 0.25% chrome |
| Catalyst 2 | 1.0% chrome |
| Ethylene Partial Pressure ($C_2$ PP) | |
| Starting $C_2$ PP | 159 psia |
| Transition Start Time (Start of $C_2$ PP reduction) | 9 h 20 min in FIGS. 6A-6C |
| Final $C_2$ PP | 95 psia |
| Ethylene Flow Rate ($C_2$ Flow) | |
| Starting $C_2$ Flow (Start of $C_2$ PP reduction) | 51.2 klbs/hr |
| $C_2$ Flow at stop of Catalyst 1 | 39.1 klbs/hr |
| $C_2$ Flow at start of Catalyst 2 | 39.0 klbs/hr |
| Minimum $C_2$ Flow after start of Catalyst 2 | 36.4 Klbs/hr |
| Final $C_2$ Flow (12 hours after temperature ramp complete) | 38.7 kbls/hr |
| Bed Height | |
| Bed Height at Start | 61.5 ft |
| Minimum Bed Height During Transition | 61.0 ft |
| Final Bed Height | 61.4 ft |
| Catalyst Injection Rate | |
| Catalyst 1 Injection Rate at Start of Transition | 390 injects per hour |
| Catalyst 1 Stopped | 8 h 45 min in FIG. 6A |
| Catalyst 2 Started | 9 h 20 min in FIG. 6A |
| Time with no catalyst flow | 25 minutes |
| Catalyst 2 Inject rate at Start | 100 injects per hour |
| Catalyst 2 Rate Increased prior to end of temperature ramp | No |
| Reactor Temperature | |
| Temperature at Start | 195.0° F. |
| Temperature at End of ramp | 206.5° F. |
| Temperature Ramp Started | 15 h 55 min in FIG. 6A |

TABLE 6-continued

| | |
|---|---|
| Temperature Ramp Completed | 26 h 55 min in FIG. 6A |
| Temperature ramp delay | 6 Hours |
| Length of Time Temperature Ramp Started after stop of Catalyst 1 | |
| Antistatic Agent (AA) | |
| Antistatic (Dome/Bed) at Start | 3 ppm/7 ppm |
| Antistatic (Dome/Bed) at Final | 0.5 ppm/9.5 ppm |
| Time for AA decrease in Dome | 12 h 30 min in FIG. 6B |
| Time AA Ramp Complete | 19 h 30 min in FIG. 6B |
| Time after catalyst switch | 3 Hours |
| Length of ramp | 7 Hours |
| Condensation (Cond) Level | |
| Percent Cond at Start | 9.3 |
| Percent Cond at Stop of Catalyst 1 | 6.9 |
| Percent Cond minimum after start of Catalyst 2 | 5.6 |
| Dome Temperature | |
| Maximum Dome Temperature | 202.8° F. |

The transition was started earlier in the timeline as compared to Examples 1-4, so the ensuing times throughout the experiment are skewed forward by about 3.5 hours. Nevertheless, the relative times in this example for the antistat ramp, and the temperature ramp were the same as in Example 4. In Example 5, the feed rate of catalyst 1 prior to the transition was reduced further in an attempt to minimize the overlap in concentrations of active catalysts 1 and 2 during the subsequent transition. In addition, the feed rate of catalyst 2 subsequent to its introduction to the reactor was reduced in comparison to Examples 3 and 4—see FIG. 6A.

These data represent a compilation of all of the improved transition procedures: delayed anti-stat ramp until 3 hours after the start of the transition—see FIG. 6B, delayed temperature ramp until after the dome temperatures had peaked, delay in increasing the rate of catalyst 2 addition until after the temperature ramp was complete, and cessation of any catalyst addition for 25 minutes at the start of the transition—see FIG. 6A.

The culmination of all of these improvements in the transition procedure resulted in a transition that produced no agglomerates—see FIG. 6C.

The carryover static and dome temperature responses are shown in FIG. 6B. Qualitatively, the amount of carryover static was lesser than in Example 1 and closer to that of Example 2. These data establish the beneficial effect of the delay in the antistat ramp during the transition.

The dome temperature excursions above reactor temperature were much attenuated in both maximum deviation (7.8° F.) and duration in comparison to the dome temperature excursions that occurred in Examples 1 and 2.

During this transition, the minimum acceptable percent condensing flowrate for good reactor temperature control was reached. Further reduction in the percent liquid condensing flow would have been problematic. Example 5 establishes the maximum time without catalyst flow and the minimum feed rate of both catalysts 1 and 2.

The combination of anti-stat flow ramp, temperature ramp timing, and maximum temporal separation of catalysts 1 and 2 while still maintaining a minimum acceptable percent condensing during the transition establishes the transition procedure in Example 5 as optimal.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

Additional Disclosure

The following enumerated embodiments are provided as nonlimiting examples.

A first aspect, which is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; (b) discontinuing the introduction of the first catalyst system to the gas phase fluidized bed reactor while continuing to feed the recycle stream to the gas phase fluidized bed reactor; (c) maintaining the condensing mode in the gas phase fluidized bed reactor at a level of at least 3 wt. % liquid phase in the recycle stream, based on the total weight of the recycle stream for a first time period while no fresh catalyst system is introduced to the gas phase fluidized bed reactor; and (d) introducing the second catalyst system to the gas phase fluidized bed reactor after the first time period, wherein the gas phase fluidized bed reactor is operating in condensing mode.

A second aspect, which is the method of the first aspect, wherein during steps (b), (c), and (d) the condensing mode is maintained at a level of at least 3 wt. % liquid phase in the recycle stream, based on the total weight of the recycle stream.

A third aspect, which is the method of any one of the first and the second aspects, wherein the first time period is from about 5 minutes to about 1 hour.

A fourth aspect, which is the method of any one of the first through the third aspects, wherein the first time period is an amount of time effective to reduce an amount of first catalyst system in the gas phase fluidized bed reactor by at least about 10%, when compared to an amount of the first catalyst system in the gas phase fluidized bed reactor during step (a).

A fifth aspect, which is the method of any one of the first through the fourth aspects, wherein steps (a), (b) and (c) occur at a first fluidized bed temperature; wherein step (d) occurs at the first fluidized bed temperature for a second time period; and wherein a fluidized bed temperature is increased from the first fluidized bed temperature to a second fluidized bed temperature at the end of the second time period, while maintaining the condensing mode at a level of at least 3 wt. % liquid phase in the recycle stream, based on the total weight of the recycle stream.

A sixth aspect, which is the method of the fifth aspect, wherein a difference between the first fluidized bed temperature and the second fluidized bed temperature is equal to or greater than about 5° F.

A seventh aspect, which is the method of any one of the first through the sixth aspects, wherein the second time period is from about 2 hours to about 12 hours.

An eighth aspect, which is the method of any one of the first through the seventh aspects, wherein the second time period is an amount of time effective to reduce an amount of first catalyst system in the gas phase fluidized bed reactor by at least about 95%, when compared to an amount of the first catalyst system in the gas phase fluidized bed reactor during step (a).

A ninth aspect, which is the method of any one of the first through the eighth aspects, wherein the second catalyst system is introduced to the gas phase fluidized bed reactor during the second time period at a first flow rate, wherein the second catalyst system is introduced to the gas phase fluidized bed reactor after the second time period at a second flow rate, and wherein the second flow rate of the second catalyst system is greater than the first flow rate of the second catalyst system.

A tenth aspect, which is the method of the ninth aspect, wherein a ratio of the second flow rate to the first flow rate is from about 1.35:1 to about 1.8:1.

An eleventh aspect, which is the method of any one of the first through the tenth aspects, wherein the gas phase fluidized bed reactor comprises an expanded section, wherein the expanded section is located above the fluidized bed; wherein during steps (a), (b), and (c) a first expanded section amount of antistatic agent is continuously introduced to the reactor expanded section, and a first bed amount of antistatic agent is continuously introduced to the fluidized bed; wherein during a first portion of the second time period of step (d) a bed amount of antistatic agent is increased from the first bed amount of antistatic agent to a second bed amount of antistatic agent, while continuing to introduce the first expanded section amount of antistatic agent to the reactor expanded section; wherein during a second portion of the second time period of step (d) an expanded section amount of antistatic agent is decreased from the first expanded section amount of antistatic agent to a second expanded section amount of antistatic agent, while continuing to introduce the second bed amount of antistatic agent to the fluidized bed; wherein after the second time period the second expanded section amount of antistatic agent is continuously introduced to the reactor expanded section, and the second bed amount of antistatic agent is continuously introduced to the fluidized bed; and wherein a sum of the first expanded section amount and the first bed amount is about the same as a sum of the second expanded section amount and the second bed amount.

A twelfth aspect, which is the method of the eleventh aspect, wherein the antistatic agent comprises an alkylamine, a hydroxylethyl alkylamine, a polyamine, a sulphonic acid, an arylsulfonic acid, benzenesulfonic acid, an alkylarylsulfonic acid, an alkylbenzenesulfonic acid, dodecylbenzenesulfonic acid, a naphthylsulfonic acid, an alkylnaphthylsulfonic acid, dinonylnaphthylsulfonic acid, a polysulfone, derivatives thereof, polymers thereof, copolymers thereof, and combinations thereof.

A thirteenth aspect, which is the method of any one of the first through the twelfth aspects, wherein a weight ratio between the first bed amount and the first expanded section amount is from about 1:1 to about 10:1, wherein the first bed amount and the first expanded section amount are based on the weight of the fresh olefin monomer contacted with at least a portion of the cooled gaseous stream to form the recycle stream.

A fourteenth aspect, which is the method of any one of the first through the thirteenth aspects, wherein a weight ratio between the second bed amount and the second expanded section amount is from about 10:1 to about 30:1, wherein the second bed amount and the second expanded section amount are based on the weight of the fresh olefin monomer contacted with at least a portion of the cooled gaseous stream to form the recycle stream.

A fifteenth aspect, which is the method of any one of the first through the fourteenth aspects, wherein the sum of the first expanded section amount and the first bed amount is from about 5 ppm to about 20 ppm, based on the weight of the fresh olefin monomer contacted with at least a portion of the cooled gaseous stream to form the recycle stream.

A sixteenth aspect, which is the method of any one of the first through the fifteenth aspects, wherein the antistatic agent is present in the gas phase fluidized bed reactor in an amount effective to reduce, prevent, or both adherence of a polymerization product to an inner surface of a gas phase fluidized bed reactor wall, an inner surface of a gas phase fluidized bed reactor expanded section, or both.

A seventeenth aspect, which is the method of any one of the first through the sixteenth aspects, wherein during step (c) of maintaining the condensing mode in the gas phase fluidized bed reactor, one or more injection lines for continuously introducing the first catalyst system to the gas phase fluidized bed reactor are flushed with an inert gas for a time period of equal to or less than about the first time period.

An eighteenth aspect, which is the method of the seventeenth aspect, wherein the inert gas comprises nitrogen, argon, helium, alkanes, ethane, propane, butane, isobutane, or combinations thereof.

A nineteenth aspect, which is the method of any one of the first through the eighteenth aspects, wherein the second catalyst system is introduced via the one or more flushed injection lines during step (d).

A twentieth aspect, which is the method of any one of the first through the nineteenth aspects, wherein a portion of the olefin monomer contacts the first catalyst in the fluidized bed of the reactor and undergoes an exothermic polymerization reaction to produce a first polymer product, and wherein a portion of the olefin monomer contacts the second catalyst in the fluidized bed of the reactor and undergoes an exothermic polymerization reaction to produce a second polymer product.

A twenty-first aspect, which is the method of the twentieth aspect, wherein the method comprises withdrawing a polymerization product stream from the gas phase fluidized bed reactor, wherein the polymerization product stream comprises the first polymer product, the second polymer product, or both.

A twenty-second aspect, which is the method of any one of the first through the twenty-first aspects, wherein the gaseous stream further comprises an inert condensable diluent, and wherein the liquid phase of the cooled gaseous stream comprises at least a portion of the inert condensable diluent of the gaseous stream.

A twenty-third aspect, which is the method of the twenty-second aspect, wherein the inert condensable diluent comprises a saturated hydrocarbon, butane, isobutane, n-pentane, isopentane, n-hexane, iso-hexanes, or combinations thereof.

A twenty-fourth aspect, which is the method of any one of the first through the twenty-third aspects further comprising (i) separating the recycle stream into a gas recycle stream and a liquid recycle stream prior to feeding the recycle stream to the reactor, wherein the gas recycle stream comprises at least a portion of the gas phase of the recycle stream, and wherein the liquid recycle stream comprises at least a portion of the liquid phase of the recycle stream; (ii) introducing at least a portion of the gas recycle stream to the reactor at a bottom of the fluidized bed; and (iii) introducing at least a portion of the liquid recycle stream to the reactor into the fluidized bed above the bottom of the fluidized bed.

A twenty-fifth aspect, which is the method of any one of the first through the twenty-fourth aspects, wherein the step (a) of continuously feeding the first catalyst system and a recycle stream comprising an olefin monomer to the gas phase fluidized bed reactor occurs at a first monomer partial pressure; wherein the step (c) of maintaining the condensing mode in the gas phase fluidized bed reactor for a first time period while no fresh catalyst system is introduced, and the step (d) of introducing the second catalyst system to the gas phase fluidized bed reactor after the first time period occur at a second monomer partial pressure; and wherein the first monomer partial pressure is greater than the second monomer partial pressure.

A twenty-sixth aspect, which is the method of the twenty-fifth aspect, wherein a difference between first monomer partial pressure and the second monomer partial pressure is equal to or greater than about 25 psi.

A twenty-seventh aspect, which is the method of any one of the first through the twenty-sixth aspects, wherein the first catalyst system, the second catalyst system, or both comprise a chromium based catalyst, a metallocene based catalyst, a Ziegler-Natta catalyst, or combinations thereof.

A twenty-eighth aspect, which is the method of any one of the first through the twenty-seventh aspects, wherein the first catalyst system, the second catalyst system, or both further comprise a support.

A twenty-ninth aspect, which is the method of the twenty-second aspect, the olefin monomer comprises ethylene, and wherein the inert condensable diluent comprises isopentane.

A thirtieth aspect, which is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction to produce a first polymer product; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; and wherein the gas phase fluidized bed reactor is characterized by a first fluidized bed temperature; (b) discontinuing the introduction of the first catalyst system to the gas phase fluidized bed reactor while continuing to feed the recycle stream to the gas phase fluidized bed reactor; (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor; (d) introducing the second catalyst system to the gas phase fluidized bed reactor after the first time period; wherein the gas phase fluidized bed reactor is operating in condensing mode; wherein the gas phase fluidized bed reactor is operating at the first fluidized bed temperature for a second time period; and (e) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream.

A thirty-first aspect, which is the method of the thirtieth aspect, wherein the method comprises withdrawing a polymerization product stream from the gas phase fluidized bed reactor during steps (a), (b), and (c), wherein the polymerization product stream comprises the first polymer product.

A thirty-second aspect, which is the method of any one of the thirtieth and the thirty-first aspects, wherein a portion of the olefin monomer contacts the second catalyst in the fluidized bed of the reactor and undergoes an exothermic polymerization reaction to produce a second polymer product.

A thirty-third aspect, which is the method of the thirty-second aspect, wherein the method comprises withdrawing a polymerization product stream from the gas phase fluidized bed reactor during step (d), wherein the polymerization product stream comprises the first polymer product and the second polymer product.

A thirty-fourth aspect, which is the method of any one of the thirtieth through the thirty-third aspects, wherein the method comprises withdrawing a polymerization product stream from the gas phase fluidized bed reactor while the fluidized bed is characterized by the second fluidized bed temperature, wherein the polymerization product stream consists essentially of the second polymer product.

A thirty-fifth aspect, which is the method of any one of the thirtieth through the thirty-fourth aspects, wherein the fluidized bed temperature is increased from the first fluidized bed temperature to the second fluidized bed temperature at a rate of from about 0.1° F./hour to about 4° F. hour.

A thirty-sixth aspect, which is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; and wherein the gas phase fluidized bed reactor is characterized by a first fluidized bed temperature; (b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed; (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed; (d) introducing the second catalyst system to the gas phase fluidized bed reactor after the first time period; wherein the gas phase fluidized bed reactor is operating in condensing mode; and wherein the gas phase fluidized bed reactor is operating at the first fluidized bed temperature for a second time period; (e) increasing a bed amount of antistatic agent from the first bed amount of antistatic agent to a second bed amount of antistatic agent during a first portion of the second time period, while continuing to introduce the first expanded section amount of antistatic agent to the reactor expanded section; (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount; and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed.

A thirty-seventh aspect which is a method of transitioning from a first catalyst system to a second catalyst system in a gas phase fluidized bed olefin polymerization reactor, the method comprising (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; wherein the gas phase fluidized bed reactor is characterized by a first fluidized bed temperature; wherein the first catalyst system is characterized by a first catalyst particle size; and wherein the first catalyst system comprises chromium (Cr) in an amount of from about 0.1 wt. % to about 0.5 wt. %, based on the total weight of the first catalyst system; (b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed; (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed; (d) introducing the second catalyst system to the gas phase fluidized bed reactor after the first time period; wherein the gas phase fluidized bed reactor is operating in condensing mode; wherein the gas phase fluidized bed reactor is operating at the first fluidized bed temperature for a second time period, wherein the second catalyst system is characterized by a second catalyst particle size; wherein the second catalyst particle size is larger than the first catalyst particle size; and wherein the second catalyst system comprises chromium (Cr) in an amount of from about 0.75 wt. % to about 1.25 wt. %, based on the total weight of the second catalyst system; (e) increasing a bed amount of antistatic agent from the first bed amount of antistatic agent to a second bed amount of antistatic agent during a first portion of the second time period, while continuing to introduce the first expanded section amount of antistatic agent to the reactor expanded section; (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount; and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed.

A thirty-eighth aspect, which is the method of the thirty-seventh aspect, wherein the first catalyst system comprises Cr/Al on a first support, wherein the second catalyst system comprises Cr/Ti on a second support, and wherein the first support and the second support are the same or different.

A thirty-ninth aspect which is the method of any one of the thirty-seventh and the thirty-eighth aspects, wherein the first support, the second support, or both comprise silica, alumina, silica-alumina, silica-coated alumina, aluminum phosphate, aluminophosphate, heteropolytungstate, titania, zirconia, magnesia, boria, zinc oxide, mixed oxides thereof, or combinations thereof.

A fortieth aspect, which is the method of any one of the thirty-seventh through the thirty-ninth aspects, wherein the first catalyst particle size is from about 25 microns to about 130 microns.

A forty-first aspect, which is the method of any one of the thirty-seventh through the fortieth aspects, wherein the second catalyst particle size is from about 60 microns to about 150 microns.

A forty-second aspect, which is the method of any one of the thirty-seventh through the forty-first aspects, wherein the first fluidized bed temperature is less than about 200° F., wherein the second fluidized bed temperature is equal to or greater than about 200° F., and wherein a difference between the first fluidized bed temperature and the second fluidized bed temperature is equal to or greater than about 5° F.

A forty-third aspect, which is a method of transitioning from a first catalyst system to a second catalyst system in a gas phase fluidized bed ethylene polymerization reactor, the method comprising (a) continuously feeding the first catalyst system and a recycle stream comprising ethylene to the gas phase fluidized bed reactor; wherein a portion of the ethylene contacts the first catalyst in the fluidized bed of the reactor and undergoes an exothermic polymerization reaction to produce a first polyethylene product; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted ethylene, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh ethylene to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; wherein the gas phase fluidized bed reactor is characterized by a first fluidized bed temperature; wherein the first catalyst system is characterized by a first catalyst particle size; and wherein the first catalyst system comprises chromium in an amount of from about 0.1 wt. % to about 0.5 wt.

%, based on the total weight of the first catalyst system; (b) discontinuing the introduction of the first catalyst system to the gas phase fluidized bed reactor while continuing to feed the recycle stream to the gas phase fluidized bed reactor, while continuing to introduce the first expanded section amount of antistatic agent to the reactor expanded section and the first bed amount of antistatic agent to the fluidized bed, and while continuing to produce the first polyethylene product; (c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, while continuing to introduce the first expanded section amount of antistatic agent to the reactor expanded section and the first bed amount of antistatic agent to the fluidized bed, and while continuing to produce the first polyethylene product; (d) introducing the second catalyst system to the gas phase fluidized bed reactor after the first time period; wherein the gas phase fluidized bed reactor is operating in condensing mode; wherein a portion of the ethylene contacts the second catalyst in the fluidized bed of the reactor and undergoes an exothermic polymerization reaction to produce a second polyethylene product; wherein the gas phase fluidized bed reactor is operating at the first fluidized bed temperature for a second time period, while continuing to produce the first polyethylene product; wherein the second catalyst system is characterized by a second catalyst particle size; wherein the second catalyst particle size is larger than the first catalyst particle size; and wherein the second catalyst system comprises chromium in an amount of from about 0.75 wt. % to about 1.25 wt. %, based on the total weight of the second catalyst system; (e) increasing a bed amount of antistatic agent from the first bed amount of antistatic agent to a second bed amount of antistatic agent during a first portion of the second time period, while continuing to introduce the first expanded section amount of antistatic agent to the reactor expanded section, and while continuing to produce the first polyethylene product; (f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is about the same as a sum of the second expanded section amount and the second bed amount; and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, while continuing to introduce the second expanded section amount of antistatic agent to the reactor expanded section and the second bed amount of antistatic agent to the fluidized bed, and while continuing to produce the second polyethylene product.

A forty-fourth aspect, which is the method of the forty-third aspect, wherein the first polyethylene product is characterized by a first weight average molecular weight, wherein the second polyethylene product is characterized by a second weight average molecular weight, and wherein the first weight average molecular weight is greater than the second weight average molecular weight.

A forty-fifth aspect, which is the method of the forty-fourth aspect, wherein the first polyethylene product is characterized by a high load melt index (HLMI) of from about 5 g/10 min to about 15 g/10 min, under a force load of 21,600 grams, as determined in accordance with ASTM D1238.

A forty-sixth aspect, which is the method of the forty-fifth aspect, wherein the first polyethylene product is characterized by a density of from about 0.940 g/cc to about 0.950 g/cc, as determined in accordance with ASTM D1505.

A forty-seventh aspect, which is the method of any one of the forty-third through the forty-sixth aspects, wherein the second polyethylene product is characterized by a melt index (MI) of from about 0.1 g/10 min to about 1 g/10 min, under a force load of 2,160 grams, as determined in accordance with ASTM D1238.

A forty-eighth aspect, which is the method of the forty-seventh aspect, the second polyethylene product is characterized by a density of from about 0.940 g/cc to about 0.950 g/cc, as determined in accordance with ASTM D1505.

A forty-ninth aspect, which is the method of any one of the forty-third through the forty-eighth aspects, wherein the first polyethylene product is characterized by a first molecular weight distribution, wherein the second polyethylene product is characterized by a second molecular weight distribution, and wherein the first molecular weight distribution is broader than the second molecular weight distribution.

A fiftieth aspect, which is the method of the forty-ninth aspect, wherein the first molecular weight distribution is from about 15 to about 18.

A fifty-first aspect, which is the method of any one of the forty-third through the fiftieth aspects, wherein the first molecular weight distribution is from about 16 to about 17.

A fifty-second aspect, which is the method of any one of the forty-third through the fifty-first aspects, wherein the second molecular weight distribution is from about 8 to about 12.

A fifty-third aspect, which is the method of any one of the forty-third through the fifty-second aspects, wherein the second molecular weight distribution is from about 9 to about 11.

A fifty-fourth aspect, which is the method of any one of the forty-third through the fifty-third aspects, wherein the step (a) of continuously feeding the first catalyst system and a recycle stream comprising ethylene to the gas phase fluidized bed reactor occurs at a first ethylene partial pressure; wherein the step (c) of maintaining the condensing mode in the gas phase fluidized bed reactor for a first time period while no fresh catalyst system is introduced and the step (d) of introducing the second catalyst system to the gas phase fluidized bed reactor after the first time period occur at a second ethylene partial pressure; and wherein the first ethylene partial pressure is greater than the second ethylene partial pressure.

A fifty-fifth aspect, which is the method of the fifty-fourth aspect, wherein a difference between the first ethylene partial pressure and the second ethylene partial pressure is equal to or greater than about 25 psi.

A fifty-sixth aspect, which is the method of any one of the forty-third through the fifty-fifth aspects, wherein the first ethylene partial pressure is from about 100 psi to about 400 psi.

A fifty-seventh aspect, which is the method of any one of the forty-third through the fifty-sixth aspects, the second ethylene partial pressure is from about 50 psi to about 250 psi.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, and the like; greater than 0.10 includes 0.11, 0.12, 0.13, and the like). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent . . . 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of transitioning from a first catalyst system to a second catalyst system in a gas phase fluidized bed olefin polymerization reactor, the method comprising:
   (a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed;
   (b) discontinuing the introduction of the first catalyst system to the gas phase fluidized bed reactor while continuing to feed the recycle stream to the gas phase fluidized bed reactor;
   (c) maintaining the condensing mode in the gas phase fluidized bed reactor at a level of at least 3 wt. % liquid phase in the recycle stream, based on the total weight of the recycle stream for a first time period while no fresh catalyst system is introduced to the gas phase fluidized bed reactor; and
   (d) introducing the second catalyst system to the gas phase fluidized bed reactor after the first time period, wherein the gas phase fluidized bed reactor is operating in condensing mode.

2. The method of claim 1, wherein during steps (b), (c), and (d) the condensing mode is maintained at a level of at least 3 wt. % liquid phase in the recycle stream, based on the total weight of the recycle stream.

3. The method of claim 1, wherein the first time period is an amount of time effective to reduce an amount of first catalyst system in the gas phase fluidized bed reactor by at least about 10%, when compared to an amount of the first catalyst system in the gas phase fluidized bed reactor during step (a).

4. The method of claim 1, wherein steps (a), (b) and (c) occur at a first fluidized bed temperature; wherein step (d) occurs at the first fluidized bed temperature for a second time period; and wherein a fluidized bed temperature is increased from the first fluidized bed temperature to a second fluidized bed temperature at the end of the second time period, while maintaining the condensing mode at a level of at least 3 wt. % liquid phase in the recycle stream, based on the total weight of the recycle stream.

5. The method of claim 4, wherein a difference between the first fluidized bed temperature and the second fluidized bed temperature is equal to or greater than about 5° F.

6. The method of claim 4, wherein the second time period is from about 2 hours to about 12 hours.

7. The method of claim 4, wherein the second catalyst system is introduced to the gas phase fluidized bed reactor during the second time period at a first flow rate, wherein the second catalyst system is introduced to the gas phase fluidized bed reactor after the second time period at a second flow rate, wherein the second flow rate of the second catalyst system is greater than the first flow rate of the second catalyst system, and wherein a ratio of the second flow rate to the first flow rate is from about 1.35:1 to about 1.8:1.

8. The method of claim 4, wherein the gas phase fluidized bed reactor comprises an expanded section, wherein the expanded section is located above the fluidized bed; wherein during steps (a), (b), and (c) a first expanded section amount of antistatic agent is continuously introduced to the reactor expanded section, and a first bed amount of antistatic agent is continuously introduced to the fluidized bed; wherein during a first portion of the second time period of step (d) a bed amount of antistatic agent is increased from the first bed amount of antistatic agent to a second bed amount of antistatic agent, while continuing to introduce the first expanded section amount of antistatic agent to the reactor expanded section; wherein during a second portion of the second time period of step (d) an expanded section amount of antistatic agent is decreased from the first expanded section amount of antistatic agent to a second expanded section amount of antistatic agent, while continuing to introduce the second bed amount of antistatic agent to the fluidized bed; wherein after the second time period the second expanded section amount of antistatic agent is continuously introduced to the reactor expanded section, and the second bed amount of antistatic agent is continuously introduced to the fluidized bed; and wherein a sum of the first expanded section amount and the first bed amount is the same as a sum of the second expanded section amount and the second bed amount.

9. The method of claim 8, wherein the antistatic agent comprises an alkylamine, a hydroxylethyl alkylamine, a polyamine, a sulphonic acid, an arylsulfonic acid, benzenesulfonic acid, an alkylarylsulfonic acid, an alkylbenzenesulfonic acid, dodecylbenzenesulfonic acid, a naphthylsulfonic acid, an alkylnaphthylsulfonic acid, dinonylnaphthylsulfonic acid, a polysulfone, polymers thereof, copolymers thereof, and combinations thereof.

10. The method of claim 8, wherein a weight ratio between the first bed amount and the first expanded section amount is from about 1:1 to about 10:1, wherein the first bed amount and the first expanded section amount are based on the weight of the fresh olefin monomer contacted with at least a portion of the cooled gaseous stream to form the recycle stream; wherein a weight ratio between the second bed amount and the second expanded section amount is from about 10:1 to about 30:1, wherein the second bed amount and the second expanded section amount are based on the weight of the fresh olefin monomer contacted with at least a portion of the cooled gaseous stream to form the recycle stream; and wherein the sum of the first expanded section amount and the first bed amount is from about 5 ppm to about 20 ppm, based on the weight of the fresh olefin monomer contacted with at least a portion of the cooled gaseous stream to form the recycle stream.

11. The method of claim 8, wherein the antistatic agent is present in the gas phase fluidized bed reactor in an amount effective to reduce, prevent, or both adherence of a polymerization product to an inner surface of a gas phase fluidized bed reactor wall, an inner surface of a gas phase fluidized bed reactor expanded section, or both.

12. The method of claim 1, wherein during step (c) of maintaining the condensing mode in the gas phase fluidized bed reactor, one or more injection lines for continuously introducing the first catalyst system to the gas phase fluidized bed reactor are flushed with an inert gas for a time period of equal to or less than about the first time period.

13. The method of claim 12, wherein the second catalyst system is introduced via the one or more flushed injection lines during step (d).

14. The method of claim 1, wherein a portion of the olefin monomer contacts the first catalyst in the fluidized bed of the reactor and undergoes an exothermic polymerization reaction to produce a first polymer product, and wherein a portion of the olefin monomer contacts the second catalyst in the fluidized bed of the reactor and undergoes an exothermic polymerization reaction to produce a second polymer product.

15. The method of claim 14, wherein the method comprises withdrawing a polymerization product stream from the gas phase fluidized bed reactor, wherein the polymerization product stream comprises the first polymer product, the second polymer product, or both.

16. The method of claim 1, wherein the gaseous stream further comprises an inert condensable diluent, and wherein the liquid phase of the cooled gaseous stream comprises at least a portion of the inert condensable diluent of the gaseous stream.

17. The method of claim 16, wherein the inert condensable diluent comprises a saturated hydrocarbon, butane, isobutane, n-pentane, isopentane, n-hexane, iso-hexanes, or combinations thereof.

18. The method of claim 1, further comprising (i) separating the recycle stream into a gas recycle stream and a liquid recycle stream prior to feeding the recycle stream to the reactor, wherein the gas recycle stream comprises at least a portion of the gas phase of the recycle stream, and wherein the liquid recycle stream comprises at least a portion of the liquid phase of the recycle stream; (ii) introducing at least a portion of the gas recycle stream to the reactor at a bottom of the fluidized bed; and (iii) introducing at least a portion of the liquid recycle stream to the reactor into the fluidized bed above the bottom of the fluidized bed.

19. The method of claim 1, wherein the step (a) of continuously feeding the first catalyst system and a recycle stream comprising an olefin monomer to the gas phase fluidized bed reactor occurs at a first monomer partial pressure; wherein the step (c) of maintaining the condensing mode in the gas phase fluidized bed reactor for a first time period while no fresh catalyst system is introduced, and the step (d) of introducing the second catalyst system to the gas phase fluidized bed reactor after the first time period occur at a second monomer partial pressure; and wherein the first monomer partial pressure is greater than the second monomer partial pressure.

20. The method of claim 19, wherein a difference between first monomer partial pressure and the second monomer partial pressure is equal to or greater than about 25 psi.

21. The method of claim 1, wherein the first catalyst system, the second catalyst system, or both comprise a chromium based catalyst, a metallocene based catalyst, a Ziegler-Natta catalyst, or combinations thereof.

22. The method of claim 16, wherein the olefin monomer comprises ethylene, and wherein the inert condensable diluent comprises isopentane.

23. A method of transitioning from a first catalyst system to a second catalyst system in a gas phase fluidized bed olefin polymerization reactor, the method comprising:
(a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction to produce a first polymer product; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; and wherein the gas phase fluidized bed reactor is characterized by a first fluidized bed temperature;

(b) discontinuing the introduction of the first catalyst system to the gas phase fluidized bed reactor while continuing to feed the recycle stream to the gas phase fluidized bed reactor;

(c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor;

(d) introducing the second catalyst system to the gas phase fluidized bed reactor after the first time period; wherein the gas phase fluidized bed reactor is operating in condensing mode; wherein the gas phase fluidized bed reactor is operating at the first fluidized bed temperature for a second time period; and (e) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream.

24. The method of claim 23, wherein the fluidized bed temperature is increased from the first fluidized bed temperature to the second fluidized bed temperature at a rate of from about 0.1° F./hour to about 4° F./hour.

25. A method of transitioning from a first catalyst system to a second catalyst system in a gas phase fluidized bed olefin polymerization reactor, the method comprising:

(a) continuously feeding the first catalyst system and a recycle stream comprising an olefin monomer to the gas phase fluidized bed reactor; wherein a portion of the olefin monomer contacts the first catalyst in the fluidized bed of the reactor and undergoes an exothermic polymerization reaction; wherein the gas phase fluidized bed reactor comprises a reactor expanded section, wherein the reactor expanded section is located above the fluidized bed; wherein the gas phase fluidized bed reactor is operating in condensing mode; wherein the condensing mode comprises: (i) withdrawing a gaseous stream from the gas phase fluidized bed reactor, wherein the gaseous stream comprises unreacted olefin monomer, (ii) cooling at least a portion of the gaseous stream to condense a portion thereof and to form a cooled gaseous stream, wherein the cooled gaseous stream comprises a gas phase and a liquid phase, and (iii) contacting at least a portion of the cooled gaseous stream with fresh olefin monomer to form the recycle stream; and wherein upon being fed to the reactor the liquid phase of the recycle stream adsorbs a portion of the heat generated by the polymerization reaction and evaporates within the fluidized bed; wherein a first expanded section amount of antistatic agent is continuously introduced to the reactor expanded section; wherein a first bed amount of antistatic agent is continuously introduced to the fluidized bed; and wherein the gas phase fluidized bed reactor is characterized by a first fluidized bed temperature;

(b) discontinuing the introduction of the first catalyst system to the gas phase fluidized bed reactor while continuing to feed the recycle stream to the gas phase fluidized bed reactor, and while continuing to introduce the first expanded section amount of antistatic agent to the reactor expanded section and the first bed amount of antistatic agent to the fluidized bed;

(c) maintaining the condensing mode in the gas phase fluidized bed reactor at a level of at least 3 wt. % liquid phase in the recycle stream, based on the total weight of the recycle stream for a first time period at the first fluidized bed temperature while no fresh catalyst system is introduced to the gas phase fluidized bed reactor, and while continuing to introduce the first expanded section amount of antistatic agent to the reactor expanded section and the first bed amount of antistatic agent to the fluidized bed;

(d) introducing the second catalyst system to the gas phase fluidized bed reactor after the first time period; wherein the gas phase fluidized bed reactor is operating in condensing mode; and wherein the gas phase fluidized bed reactor is operating at the first fluidized bed temperature for a second time period;

(e) increasing a bed amount of antistatic agent from the first bed amount of antistatic agent to a second bed amount of antistatic agent during a first portion of the second time period, while continuing to introduce the first expanded section amount of antistatic agent to the reactor expanded section;

(f) decreasing an expanded section amount of antistatic agent from the first expanded section amount of antistatic agent to a second expanded section amount of antistatic agent during a second portion of the second time period, while continuing to introduce the second bed amount of antistatic agent to the fluidized bed; wherein a sum of the first expanded section amount and the first bed amount is the same as a sum of the second expanded section amount and the second bed amount; and (g) increasing a fluidized bed temperature from the first fluidized bed temperature to a second fluidized bed temperature at the end of the second time period, while maintaining the condensing mode at a level of at least 3 wt. % liquid phase in the recycle stream, based on the total weight of the recycle stream, and while continuing to introduce the second expanded section amount of antistatic agent to the reactor expanded section and the second bed amount of antistatic agent to the fluidized bed.

* * * * *